United States Patent
Iversen et al.

(10) Patent No.: US 11,718,799 B2
(45) Date of Patent: Aug. 8, 2023

(54) PROCESS FOR UPGRADING RENEWABLE LIQUID HYDROCARBONS

(71) Applicant: STEEPER ENERGY APS, Hørsholm (DK)

(72) Inventors: Steen B. Iversen, Vedbæk (DK); Julie Katerine Rodriguez Guerrero, Calgary (CA); Pedro Rafael Pereira Almao, Calgary (CA); Monica Bartolini Tiberi, Cochrane (CA); Marianna Isabel Trujillo Vaccari, Calgary (CA); Lante Antonio Carbognani, Calgary (CA)

(73) Assignee: STEEPER ENERGY APS, Hørsholm (DK)

( * ) Notice: Subject to any disclaimer, the term of this patent is extended or adjusted under 35 U.S.C. 154(b) by 205 days.

(21) Appl. No.: 17/429,170

(22) PCT Filed: Feb. 10, 2020

(86) PCT No.: PCT/EP2020/025057
§ 371 (c)(1),
(2) Date: Aug. 6, 2021

(87) PCT Pub. No.: WO2020/160850
PCT Pub. Date: Aug. 13, 2020

(65) Prior Publication Data
US 2022/0049168 A1 Feb. 17, 2022

(30) Foreign Application Priority Data
Feb. 8, 2019 (DK) .......................... PA 201970087

(51) Int. Cl.
C10G 51/04 (2006.01)
C10G 69/06 (2006.01)
(Continued)

(52) U.S. Cl.
CPC .............. *C10G 51/04* (2013.01); *B01J 27/22* (2013.01); *C10G 69/06* (2013.01);
(Continued)

(58) Field of Classification Search
None
See application file for complete search history.

(56) References Cited

U.S. PATENT DOCUMENTS

2008/0161428 A1* 7/2008 Strait .................. C07C 41/01
 422/600
2010/0256428 A1 10/2010 Marker et al.
(Continued)

FOREIGN PATENT DOCUMENTS

WO WO 2018/011139 A1 1/2018
WO WO 2018/069794 A1 4/2018

*Primary Examiner* — Tam M Nguyen
(74) *Attorney, Agent, or Firm* — Birch, Stewart, Kolasch & Birch, LLP

(57) ABSTRACT

The invention relates to a catalytic process for upgrading a renewable crude oil produced from biomass and/or waste comprising providing a renewable crude oil and pressurizing it to a pressure in the range in the range 60 to 150 bar, contacting the pressurized renewable crude oil with hydrogen and at least one heterogeneous catalyst contained in a first reaction zone at a weight based hourly space velocity (WHSV) in the range 0.1 to 2.0 $h_{-1}$ and at a temperature in the range of 150° C. to 360° C., hereby providing a partially upgraded renewable crude oil, separating the partially upgraded renewable crude oil from the first reaction zone to a partially upgraded heavy renewable oil fraction, a partially upgraded light renewable oil fraction, a water stream and a process gas stream, introducing the separated and partially upgraded heavy renewable oil fraction and separated process gas to a second reaction zone comprising at least two reactors arranged in parallel and being adapted to operate in
(Continued)

a first and a second mode of operation, the reactors comprising dual functioning heterogeneous catalyst(-s) capable of performing a catalytic steam cracking reaction in a first mode of operation or a steam reforming reaction in a second mode of operation, where the partially upgraded heavy renewable oil fraction from the first reaction zone is contacted with the dual functioning heterogeneous catalyst and steam at a pressure of 10 to 150 bar and a temperature of 350° C. to 430° C. whereby a catalytic steam cracking of the partially upgraded heavy renewable oil is performed in the reactors in the first mode of operation, hereby providing a further upgraded heavy renewable oil fraction, while separated process gas from the first and/or second reaction zone is contacted with the dual functioning catalyst and steam at a pressure of 0.1 to 10 bar and a temperature of 350 to 600° C. in the reactors in the second mode of operation and contacted with the dual functioning catalyst, thereby producing a hydrogen enriched gas, separating the further upgraded heavy renewable oil fraction from the catalytically steam cracking reactor to at least one light renewable oil fraction, a heavy renewable oil fraction, a hydrogen rich process gas and a water phase, separating hydrogen from the hydrogen enriched gas from the catalytic steam cracking zone and/or from the catalytic steam reforming and recycling it to the first reaction zone, alternating the reactors between the first mode of operation and the second mode of operation at predetermined time intervals thereby allowing for regeneration of the heterogeneous catalyst for the catalytic steam cracking in the first mode of operation while performing the steam reforming reaction of the hydrocarbons contained in the process gas in the second mode of operation;

38 Claims, 13 Drawing Sheets

(51) Int. Cl.
  *C10G 69/04* (2006.01)
  *C10G 69/08* (2006.01)
  *B01J 27/22* (2006.01)
(52) U.S. Cl.
  CPC ............... *C10G 2300/1011* (2013.01); *C10G 2300/302* (2013.01); *C10G 2300/4006* (2013.01); *C10G 2300/4012* (2013.01); *C10G 2300/4018* (2013.01); *C10G 2300/42* (2013.01); *C10G 2300/70* (2013.01); *C10G 2400/04* (2013.01); *C10G 2400/08* (2013.01)

(56) References Cited

U.S. PATENT DOCUMENTS

| | | | |
|---|---|---|---|
| 2016/0045841 A1* | 2/2016 | Kaplan | C01B 32/05 429/49 |
| 2016/0304344 A1* | 10/2016 | Liu | B01J 20/043 |
| 2018/0066193 A1* | 3/2018 | Iversen | C12P 5/02 |
| 2018/0171238 A1* | 6/2018 | Hanks | C10G 7/04 |
| 2021/0062098 A1* | 3/2021 | Iversen | C10G 3/50 |
| 2021/0246388 A1* | 8/2021 | Koseoglu | C10B 55/00 |
| 2021/0284916 A1* | 9/2021 | Iversen | C10G 3/42 |
| 2022/0049168 A1* | 2/2022 | Iversen | C10G 1/002 |
| 2022/0364001 A1* | 11/2022 | Campani | C10G 3/50 |

* cited by examiner

PROCESS FOR UPGRADING RENEWABLE LIQUID HYDROCARBONS

FIELD OF THE INVENTION

The present invention relates to the field of producing renewable liquid hydrocarbon from biomass and/or waste streams in a quality compatible with the existing infrastructure. In particular, it relates to an improved catalytic upgrading process and apparatus for producing compatible renewable fuels or blend stocks for transportation fuels, finished transportation fuels, and renewable base oils for production of renewable lubricants using significantly less or no external hydrogen and energy i.e. producing compatible renewable liquid hydrocarbons in a more efficient, economical and environmentally sustainable way.

BACKGROUND OF THE INVENTION

Climate change has forced the international society to set up ambitious goals for reducing the total emissions of greenhouse gases to target a maximum temperature increase of 2° C. by 2050. Efficient and economical conversion of biomass and organic waste resources into liquid hydrocarbons holds a key pathway for reducing the carbon footprint of liquid hydrocarbons for e.g. the transport sector.

Hydrothermal and/or solvothermal liquefaction (HTL; STL) are very efficient thermochemical methods for conversion of such bio-organic materials into a renewable crude oil using high pressure water and/or solvents near the critical point of water (218 bar, 374° C.) e.g. at pressures from 150 bar to 400 bar and temperatures in the range 300 to 450° C. At these conditions water obtains special properties making it an ideal medium for many chemical reactions such as conversion of bio-organic materials into renewable crude oils. Hydrothermal liquefaction is very resource efficient due to its high conversion and carbon efficiency as all organic carbon material (including recalcitrant bio-polymers such as lignin) is directly converted to renewable bio-crude oil. It has very high energy efficiency due to low parasitic losses, and, unlike other thermochemical processes no latent heat addition is required as there is no drying or phase change required i.e. wet materials can be processed. Furthermore hydrothermal and/or solvothermal liquefaction processes allows for extensive heat recovery processes. The renewable crude oil produced has many similarities with its fossil counterparts, and is generally of a much higher quality than e.g. bio oils produced by pyrolysis that typically comprise significant amount of heteroatoms such oxygen as well as a high water content.

The quantity and quality of the renewable crude oil produced depends on the specific operating conditions and hydrothermal liquefaction process applied e.g. parameters such as feed stock, dry matter content, pressure and temperature during heating and conversion, catalysts, presence of liquid organic compounds, heating- and cooling rates, separation system etc.

As for conventional crude oils, the renewable crude oil produced from hydrothermal and/or solvothermal liquefaction processes needs to be upgraded, before it can be used in its final applications e.g. direct use in the existing infrastructure as "drop-in" fuels or blend stocks. For conventional crude oils, this is typically performed by first fractionating the crude oils into specific boiling point fractions and thereafter treating the individual boiling point fractions by catalytic processes such as hydroprocesses like hydrotreatment, hydrocracking, cracking & isomerization to provide finished transportation fuels.

However, despite that the renewable crude oils produced resembles its fossil counter parts in many ways they typically also has its distinct properties including:

- High boiling point (poor volatility), high Total Acid Number (TAN) and high viscosity than conventional fossil oils
- Huge difference in boiling point with and without oxygen
- Higher oxygen content than fossil oils results in a higher heat release during upgrading by e.g. catalytic hydrogenation due to higher oxygen content. In fact, the heat released per mass of heteroatom is 2-4 times larger for oxygen removal compared to conventional sulphur removal. Meanwhile, the heteroatom content is 1-2 orders of magnitude higher for oxygenated crude oils compared to petroleum crude. As a result, the heat release during hydrotreating of such oil is around 20-200 times larger than during hydro-desulphurization of a petroleum feed. Hence there is a risk of a rapid and significant temperature increase and resulting hydrogen starvation around the active catalyst sites induce risk of deactivation, coking and fouling of the catalyst beds, and pressure drop build up. Hence, process design and operating protocols including control of the temperatures are important aspects of the upgrading process design.
- Higher oxygen content than fossil oils results in higher hydrogen consumption than its fossil counter parts, which directly effects not only process economy and the scale where such upgrading process is economically viable, but also its carbon footprint depending on the source of hydrogen.
- Oxygenated renewable crude oils are rich in both aromatic and phenolic compounds, and the Conradson carbon of 15-20 wt. % is high compared to conventional hydroprocessing feeds. The aromaticity and in particular the PAH content of a hydrotreater feed relates to risk of catalyst deactivation by coking. Additionally, oxygenates and in particular methoxy- and diphenols are coke precursors. Thus, it is important to control the coking propensity during the upgrading process. Catalyst acidity, including that of the support, facilitate coking, and thus the heterogeneous catalysts, upgrading scheme and operating protocol needs to be carefully selected.
- The renewable crude oil is not fully blendable/compatible with its fossil counter parts nor with the partially or fully upgraded oil resulting from e.g. catalytic treatment with hydrogen.
- Renewable crude oils have a low sulphur content when produced from low sulphur carbonaceous feed stock sources such as many ligno-cellulosic feedstocks. This needs to be taken into account in both the upgrading process design, operating protocol and heterogeneous catalyst design.

These distinct properties need to be taken into account when upgrading process.

OBJECTIVE OF THE INVENTION

Accordingly, it is an objective of the present invention to provide an improved upgrading process, and an improved apparatus for upgrading oxygen containing renewable oils partly or wholly remedying the problems and disadvantages described above i.e. a more efficient, economical and sustainable process e.g using significantly less or no external hydrogen compared to the prior art and/or having a lower carbon footprint and/or being more stable and economical than prior art processes.

DESCRIPTION OF THE INVENTION OR SUMMARY OF THE INVENTION

According the invention, the objectives are fulfilled by a catalytic process for upgrading a renewable crude oil produced from biomass and/or waste comprising:

a. Providing a renewable crude oil and pressurizing it to a pressure in the range in the range 60 to 150 bar,
b. Contacting the pressurized renewable crude oil with hydrogen and at least one heterogeneous catalyst contained in a first reaction zone at a weight based hourly space velocity (WHSV) in the range 0.1 to 2.0 $h_{-1}$ and at a temperature in the range of 150° C. to 360° C., hereby providing a partially upgraded renewable crude oil;
c. Separating the partially upgraded renewable crude oil from the first reaction zone into a partially upgraded heavy renewable oil fraction; a partially upgraded light renewable oil fraction; a water stream and a process gas stream;
d. Introducing the separated and partially upgraded heavy renewable oil fraction and separated process gas to a second reaction zone comprising at least two reactors arranged in parallel and being adapted to operate in a first and a second mode of operation, the reactors comprising dual functioning heterogeneous catalyst(-s) capable of performing a catalytic steam cracking reaction in a first mode of operation or a steam reforming reaction in a second mode of operation, where the partially upgraded heavy renewable oil fraction from the first reaction zone is contacted with the dual functioning heterogeneous catalyst and steam at a pressure of 10 to 150 bar and a temperature of 350° C. to 430° C. whereby a catalytic steam cracking of the partially upgraded heavy renewable oil is performed in the reactors in the first mode of operation, hereby providing a further upgraded heavy renewable oil fraction, while separated process gas from the first and/or second reaction zone is contacted with the dual functioning catalyst and steam at a pressure of 0.1 to 10 bar and a temperature of 350 to 600° C. in the reactors in the second mode of operation and contacted with the dual functioning catalyst, thereby producing a hydrogen enriched gas;
e. Separating the further upgraded heavy renewable oil fraction from the catalytically steam cracking reactor into at least one light renewable oil fraction, a heavy renewable oil fraction, a hydrogen rich process gas and a water phase;
f. Separating hydrogen from the hydrogen enriched gas from the catalytic steam cracking zone and/or from the catalytic steam reforming and recycling it to the first reaction zone;
g. Alternating the reactors between the first mode of operation and the second mode of operation at predetermined time intervals thereby allowing for regeneration of the heterogeneous catalyst for the catalytic steam cracking in the first mode of operation while performing the steam reforming reaction of the hydrocarbons contained in the process gas in the second mode of operation;

Thereby a significantly simpler process requiring less or no external hydrogen than prior art processes and hence being more effective and economical and environmentally sustainable than prior art processes is provided.

Further embodiments and advantageous effects of the present invention are presented in the following detailed description of preferred embodiments of the invention.

Throughout this document the terms "comprising" or "comprises" do not exclude other possible elements or steps. Also, the mentioning of references such as "a" or "an" etc. should not be construed as excluding a plurality.

DESCRIPTION OF AN ADVANTAGEOUS EMBODIMENT OF THE INVENTION

Figure 1:
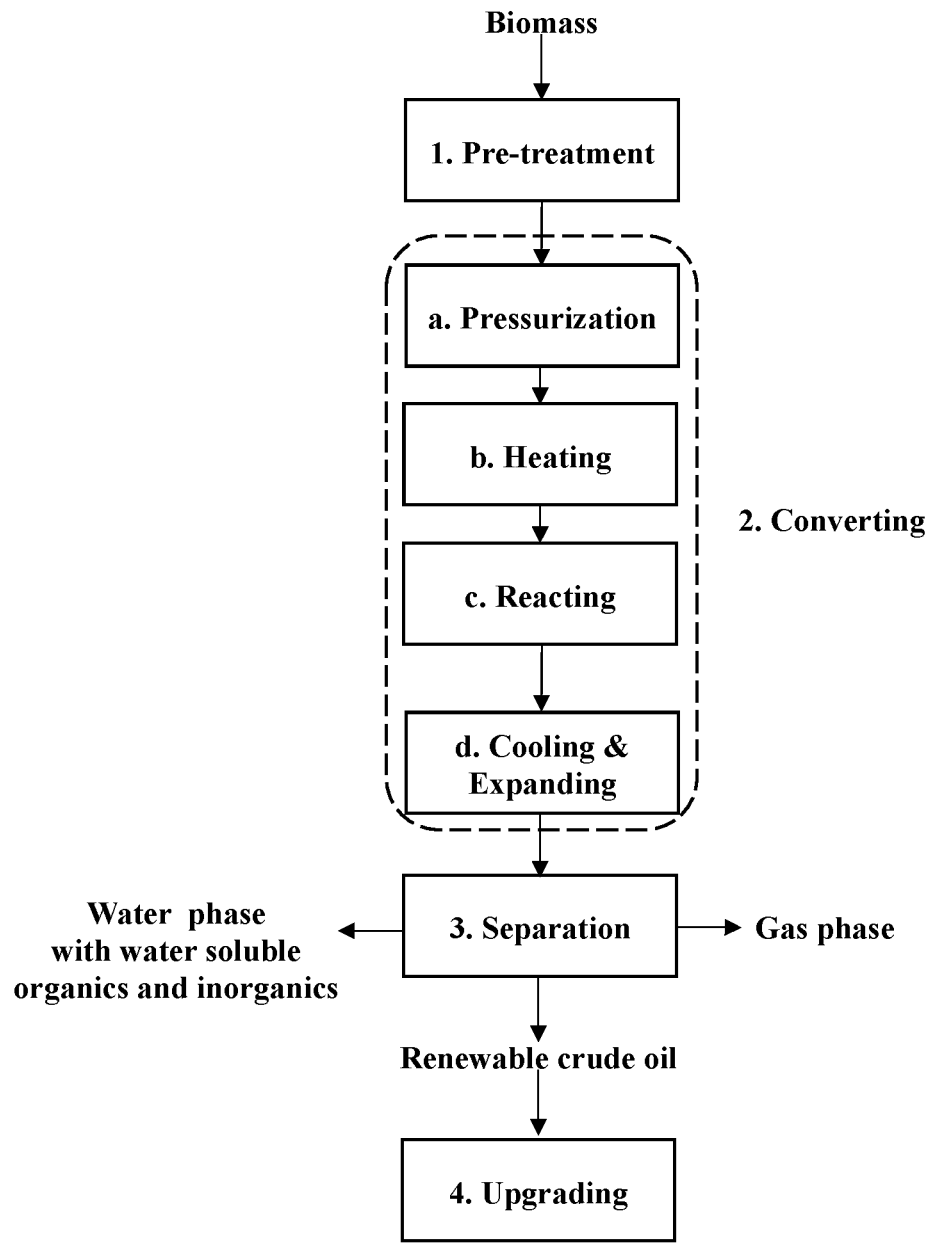
FIG. 1 shows an embodiment of a continuous process for production of renewable crude oil according to the present invention.

FIG. 1 shows an embodiment of a continuous production process for producing an oxygen containing renewable crude oil produced from carbonaceous materials such as biomass.

As shown in FIG. 1, the carbonaceous material is first subjected to a pre-treatment step. The pre-treatment is designed to convert the carbonaceous material into a pumpable feed mixture and generally includes means for size reduction of the carbonaceous and slurrying the carbonaceous material with other ingredients such as water, catalysts and other additives such as organics in the feed mixture.

The feed mixture is pressurized to a pressure of at least 150 bar and up to about 400 bar before it is heated to a temperature from about 300 to 450° C.

The feed mixture is generally maintained at these conditions for sufficient time for conversion of the carbonaceous material e.g. for a period of 5 to 30 minutes before it is cooled and expanded to ambient.

The converted feed mixture is further separated into at least a gas phase, an oxygen containing renewable crude oil phase and a water phase with water-soluble organic compounds as well as dissolved salts such as homogeneous catalysts and eventually suspended particles. The separation may be performed by gravimetric phase separation or other suitable means such as centrifugation.

The oxygen containing renewable crude oil enters the upgrading part of the process according to the present invention.

Figure 2:
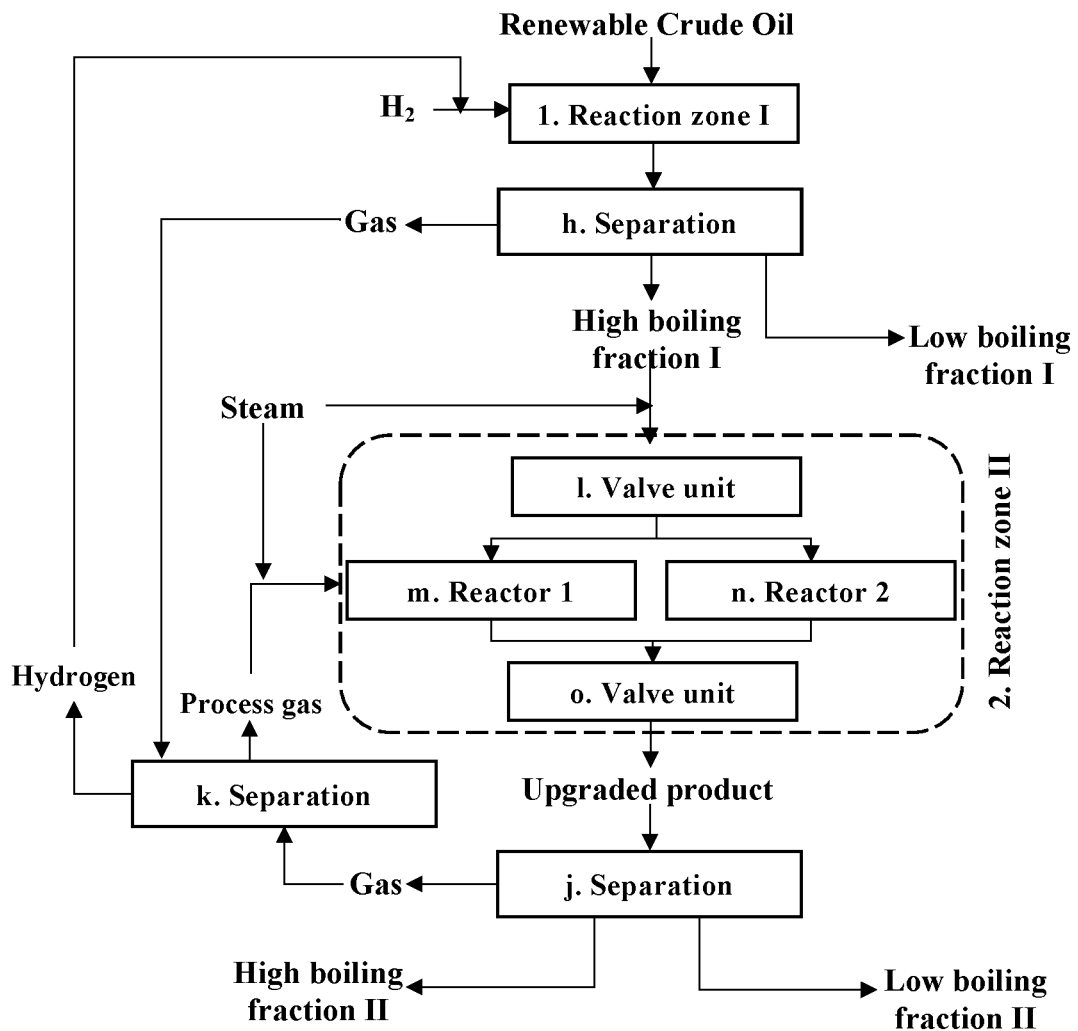
FIG. 2 shows a preferred embodiment of a catalytic upgrading process for upgrading a renewable crude oil according to the present invention comprising a first reaction zone for producing a partially upgraded renewable oil and a second reaction zone comprising two modes of operation of reactors.

FIG. 2 shows an advantageous embodiment of a catalytic process for upgrading a renewable crude oil produced from biomass and/or waste according to the present invention comprising:

a. Providing a renewable crude oil and pressurizing it to a pressure in the range in the range 60 to 150 bar, b. Contacting the pressurized renewable crude oil with hydrogen and at least one heterogeneous catalyst contained in a first reaction zone at a weight based hourly space velocity (WHSV) in the range 0.1 to 2.0 $h_{-1}$ and at a temperature in the range of 150° C. to 360° C., hereby providing a partially upgraded renewable crude oil;

c. Separating the partially upgraded renewable crude oil from the first reaction zone into a partially upgraded heavy renewable oil fraction; a partially upgraded light renewable oil fraction; a water stream and a process gas stream;

d. Introducing the separated and partially upgraded heavy renewable oil fraction and separated process gas to a second reaction zone comprising at least two reactors arranged in parallel and being adapted to operate in a first and a second mode of operation, the reactors comprising dual functioning heterogeneous catalyst(-s) capable of performing a catalytic steam cracking reaction in a first mode of operation or a steam reforming reaction in a second mode of operation, where the partially upgraded heavy renewable oil fraction from the first reaction zone is contacted with the dual functioning heterogeneous catalyst and steam at a pressure of 10 to 150 bar and a temperature of 350° C. to 430° C. whereby a catalytic steam cracking of the partially upgraded heavy renewable oil is performed in the reactors in the first mode of operation, hereby providing a further upgraded heavy renewable oil fraction, while separated process gas from the first and/or second reaction zone is contacted with the dual functioning catalyst and steam at a pressure of 0.1 to 10 bar and a temperature of 350 to 600° C. in the reactors in the second mode of operation and contacted with the dual functioning catalyst, thereby producing a hydrogen enriched gas;

e. Separating the further upgraded heavy renewable oil fraction from the catalytically steam cracking reactor into at least one light renewable oil fraction, a heavy renewable oil fraction, a hydrogen rich process gas and a water phase;

f. Separating hydrogen from the hydrogen enriched gas from the catalytic steam cracking zone and/or from the catalytic steam reforming and recycling it to the first reaction zone;

g. Alternating the reactors between the first mode of operation and the second mode of operation at predetermined time intervals thereby allowing for regeneration of the heterogeneous catalyst for the catalytic steam cracking in the first mode of operation while performing the steam reforming reaction of the hydrocarbons contained in the process gas in the second mode of operation;

Renewable Crude Oil

The oxygen content of renewable crude oil provided is typically in the range 3 to 20% by weight such as in the range in the range 3 to 15% by weight.

Preferably the oxygen content of the renewable crude oil is in the range 4 to 13% by weight such as 5 to 12% by weight.

The moisture content of the renewable crude oil is typically below 2.0% by weight such as below 1.5% by weight. Preferably the water content of the renewable oil is below 1.0% by weight such as below 0.5% by weight. Even more preferably the moisture content of the renewable crude oil is below 0.3% by weight such as below 0.1% by weight.

The Total Acid Number (TAN) of the renewable crude oil is typically in the range from 4 to 80 mg KOH/g oil such as in the range 4 to 70 mg/g. Preferred embodiments include applications where the TAN is in the range of 5 to 60 mg KOH/g oil such as in the range of 5 to 50 mg KOH/g oil.

In many applications of the present invention, the fraction of the renewable oxygen containing crude oil provided having a boiling point below than 350° C. is less than 70% by weight such as less than 60% by weight. However, other preferred embodiments include applications where the fraction of the renewable oxygen containing crude oil provided having a boiling point below than 350° C. is less than 50% by weight such as less than 40% by weight.

The fraction of the renewable oxygen containing crude oil provided having a boiling point of more than 450° C. is typically more than 10% by weight such as more than 20% by weight. Preferred embodiments include applications where the fraction of the renewable oxygen containing crude oil provided having a boiling point below than 450° C. is more than 30% by weight such as more than 40% by weight.

In many embodiments of the invention the oxygen containing renewable crude oil provided in step a has an aromatics content of at least 20% by weight or at least 30% by weight; particularly in the range from about 20 to 70% by weight such as in the range from about 30% by weight to about 70% by weight.

The H/C ratio of the renewable oil is relatively low compared to other renewable crude oils produced from many relevant carbonaceous materials such as ligno-cellulosic. Often the H/C ratio of the renewable crude oil is less than 1.6 such as less than 1.5. In other applications, the H/C ratio of the renewable crude oil is below 1.4 such as below 1.3.

The concentration of inorganics in the renewable crude oil may in a preferred embodiments of the present invention be in the range from about 0.1 ppm by weight to about 1000 ppm by weight, such as in the range 1 ppm by weight to about 600 ppm by weight; preferably in the range from about 1 ppm by weight to about 400 ppm by weight such as in the range from about 1 ppm by weight to about 300 ppm by weight; even more preferably in the range from 1 ppm by weight to about 200 ppm by weight such as in the range from about 1 ppm by weight to about 100 ppm by weight.

The sulphur content of the renewable crude oil according to the present invention is often less than or equal to 0.5 wt. % such as below 0.3 wt. %. In many embodiments according to the present invention, the sulphur content of the renewable oil is less than or equal to 0.2 wt. % such as below 0.1 wt. %. Further preferred embodiments include oxygen containing renewable crude oil, where the sulphur content is less than 0.05 wt. % such as less than 0.01 wt. %.

The nitrogen content of the oxygen containing renewable crude oil is in a number of preferred embodiments in the range 0.01 to 7 wt. % such as in the range 2.0 to 6.5 wt. %.

The renewable crude oil provided may be produced from a wide range of biomass and waste materials by techniques such as hydrothermal or solvothermal liquefaction, and by advanced pyrolysis techniques such as thermo-catalytic reforming (http://www.susteen-tech.com/overview.html) and fast pyrolysis followed by hydroreforming as proposed by Radlein et al (U.S. Pat. No. 9,896,390).

In a particularly preferred and advantageous embodiment the renewable crude oil is provided by
  Providing one or more biomass and/or waste material(-s) contained in one or more feedstock
  Providing a feed mixture by slurring the biomass and/or waste material(-s) in one or more fluids at least one of which comprises water;
  Pressurizing the feed mixture to a pressure in the range 100 to 400 bar;
  Heating the pressurized feed to a temperature in the range 300 to 450° C.;
  Maintaining the pressurized and heated feed mixture in a reaction zone in a reaction zone for a conversion time of 3 to 30 minutes.
  cooling the converted feed mixture to a temperature in the range 25 to 200° C.
  Expanding the converted feed mixture to a pressure of 1 to 120 bar;
  Separating the converted feed mixture in to a renewable crude oil, a gas phase and a water phase comprising water soluble organics and dissolved salts The biomass and/or waste material contained in the one or more feedstock may be in a solid form or may have a solid appearance, but may also be in the form of a sludge or a liquid. Biomass materials according to the present invention are related to lignocellulosic materials such as woody biomass and agricultural residues. Such carbonaceous materials generally comprise lignin, cellulose, and hemicellulose. Non limiting examples of biomass and waste materials according to the present invention include woody biomass and residues such as wood chips, sawdust, forestry thinnings, road cuttings, bark, branches, garden and park wastes & weeds, energy crops like coppice, willow, miscanthus, and giant reed; agricultural and byproducts such as grasses, straw, stems, stover, husk, cobs and shells from e.g. wheat, rye, corn, rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyanobacteria; animal beddings and manures such as the fibre fraction from livestock production; municipal and industrial waste streams such as black liquor, paper sludges, off-specification fibres from paper production; residues and byproducts from food production such as juice or wine production; vegetable oil production, sorted municipal solid waste, source sorted household wastes, restaurant wastes, slaughterhouse waste, sewage sludge and combinations thereof.

First Reaction Zone

The operating temperature, operating pressure, heterogeneous catalyst and liquid hourly space velocity of the first reaction zone is according to invention generally selected so as to reduce the content of reactive oxygenated compounds such as carboxylic and amino acids, ketones, aldehydes, alcohols, phenols etc. and/or unsaturated compounds (olefins) and/or aromatics and/or metals of the renewable crude oil. These reactive compounds can cause problems with polymerization/gumming, coking and clogging of catalyst beds and/or catalyst deactivation if the reactions is not properly managed and controlled. Hence, the rate of reactions the needs to be carefully managed and controlled.

Hence, the first reaction zone according to the present invention is where the first reaction zone comprises a stabilization zone for reducing and/or eliminating the amount of reactive species such as aldehydes and/or ketones and/or other oxygenates and/or unsaturated compounds and/or aromatic compounds and/or inorganic elements such as metal compounds thereby reducing polymerization and/or coking and/or fouling during heat up and thereby protecting down stream catalysts from clogging and poisoning. Thereby the down time is reduced, and catalyst lifetime extended, therefore a more effective and economical process is provided.

The operating pressure in the first reaction zone may be at least 60 bar such as an operating pressure in the first reaction zone of at least 70 bar; Preferably the operating pressure in the first reaction zone is at least 80 bar such as an operating pressure in the first reaction zone of at least 90 bar;

Further according to a preferred embodiment of the invention the operating pressure in the first reaction zone may be below 200 bar such as an operating pressure in the first reaction zone below 180 bar; Preferably the operating pressure of the first and/or second reaction zone is below 150 bar such as below 120 bar.

In an advantageous embodiment the operating pressure of the first reaction zone is in the range 70 bar to 130 bar such as in the range 80 to 110 bar.

The operating temperature in the first reaction zone depends on the specific catalyst(-s) and hydrogen pressure used in the first reaction zone. The lower limit of the operating temperature in the first reaction zone is generally selected for the desired reactions to proceed with a reasonable rate without depleting the hydrogen on the surface, which may lead to coking, whereas the upper limit is selected so as to avoid excessive coking.

The upper limit of the operating temperature of said first reactor of reaction zone 1 is typically selected to avoid excessive coking. Hence in many embodiments the inlet temperature to the first reaction zone is below 360° C. such as below 350° C., preferably below 340° C. such as below 330° C.

The lower limit for the operating temperature of said first reactor of reaction zone 1 may according to the invention be above 200° C. such as an operating temperature of the first reaction zone 1 of at least 270° C.; preferably the temperature to the first reaction zone is at least 280° C. Advantageously the operating temperature of the first reaction zone is in the range 260 to 350° C. such as in the range 280 to 350° C.

The inlet temperature of the renewable crude oil prior to the pressurization step is in a preferred embodiment in the range 80 to 150° C. such as in the range 100 to 130° C.

The heating from the inlet temperature of the pressurized renewable crude oil to the operating temperature may be all be supplied by heating the pressurized renewable crude oil in an external heat exchanger. However, in many advantageous embodiments of the present invention at least part of the heat required to reach the operating temperature in reaction zone 1 is provided in the reactors. In a preferred embodiment of the invention the inlet temperature of the renewable crude oil to the first reaction zone is substantially the same as the temperature prior to the pressurization step, and substantially all of heating to operating temperature is performed in the reactors of the first reaction zone.

The hydrogenation reactions in the first reaction zone are highly exothermic i.e. heat is generated by said reactions. Hence, the outlet temperature from the reactors is generally higher than the inlet temperature, and at least part of the heat for heating of the renewable oil to the desired operating temperatures in reaction zone may be generated by the reactions in the zone.

Often the renewable crude oil in the first reaction zone is very reactive due to the relatively high oxygen content. Too high activity of heterogeneous catalyst in the first reaction zone is not desired as the surface of the catalyst may be depleted and may lead to deposits. Further too high activity of the heterogeneous catalyst in the first part of the first reactive zone may lead to deactivation of the catalyst/loss of surface area due to generation of hot spots from the exothermic reaction occurring during said upgrading process in the first reaction zone.

Hence, according to aspects of the present invention the activity of the heterogeneous catalysts in the first reaction zone are selected so as to have a relatively low activity initially and are gradually increased through the first reaction zone. Hereby, the control of reaction rate and temperature profile is improved and hot spots are avoided.

The first reaction zone may according to the present invention comprise at least 2 reactors. An advantageous embodiment is where the first reaction zone comprises more than one heterogeneous catalyst and where the reaction rates are controlled by grading the catalyst bed(-s) so that the catalyst activity is increasing during the first reaction zone. Hereby an improved control of the temperature increase from the exothermic reactions and resulting catalyst deactivation and coking due to hydrogen starvation is obtained. By controlling the reaction rates this way it is further obtained that the product and feed are fully miscible at any point in the first reaction zone whereby the risk of reactor plugging due to parts of the oil being deposited due to incompatibility between the incoming feed and the product from the reaction.

Typically, the heterogeneous catalyst(-s) in the first reaction zone comprises one or more hydrotreating, hydroprocessing, hydrocracking, hydrogenation, hydrodearomatization, hydrodemetallization and/or hydro-isomerization catalysts.

Preferred forms of the heterogeneous catalyst(-s) according to many aspects of the present invention include heterogeneous catalyst(-s) on a sulphided form, a reduced form and/or in a carbide form and/or in a carbonate and/or in a nitride form and/or in a phosphide form and/or in a phosphate and/or in a boride form and/or in a oxide form and/or in a hydroxide form and/or a sulphate form or a combination thereof.

An advantageous embodiment is where the first reaction zone comprises a stabilization zone comprising a heterogeneous catalyst with a relatively low activity and an open pore structure e.g. a high pore volume with many pores in the macro and mesoporous size range to ensure accessibility of the oil composition along with a large metal and metalloid storage capacity. Hereby a hydro-demetalization occurs in parallel with hydro-deoxygenation reactions, which protects the more active heterogeneous catalyst(-s) used down stream.

The catalyst in the stabilization zone is often selected to be less active than in the subsequent catalytic reactor so as to obtain a controlled pre-reaction and temperature profiles and to ensure the incoming feed and the products are not too different at a given position in the reaction zone.

In a preferred embodiment the heterogeneous catalyst the stabilization zone of first reaction zone is a spent catalyst from the more active catalysts in the subsequent reactors in the first and/or second reaction zone.

In another preferred embodiment a lower activity may be obtained by diluting the catalyst with an inert material such as silicon carbide.

In a further advantageous embodiment a combination of dilution and catalysts with different activities are applied.

The weight hourly space velocity (WHSV) in said stabilization zone is according to many aspects of the invention in the range 0.1 to 1.5 hours$_{-1}$ such as 0.2 to 1.0 hours$_{-1}$. Preferably the weight hourly space velocity (WHSV) in the stabilization zone is in the range from about 0.2 to 0.5 hours$_{-1}$.

Preferred forms of the heterogeneous catalyst(-s) used in the first reaction zone is according to many aspects of the present invention include heterogeneous catalyst(-s) on a sulphided form, reduced form and/or in a carbide form and/or in a carbonate and/or in a nitride form and/or in a phosphide form and/or in a phosphate and/or in a boride form and/or in a borate form and/or in a oxide form and/or in a hydroxide form and/or in a sulphate form or a combination thereof.

A preferred embodiment of the invention is where the heterogeneous catalyst in the first reaction zone and/or second reaction zone comprises one or more elements selected from the group of Fe, Ni, Co, Mo, Cr, W, Ce, Ru, Rh, Pd, Pt, V, Cu, Au, Zr, Ti, B, Bi, Nb, Na, K supported on a supporting structure.

A further preferred embodiment of the invention is where the heterogeneous catalyst(-s) in the first reaction zone and/or second reaction zone according to the present invention is/are a bi-metallic or tri-metallic catalyst supported on a supporting structure.

An advantageous embodiment of the invention is where the bi-metallic or tri-metallic heterogeneous catalyst(-s) and/or catalyst elements in the first reaction zone and/or second reaction zone comprises a. one or two metals selected from group VIIIB of the periodic table such as one or two metals selected from the group of Fe, Co, Ni, Ru supported on a supporting structure, and
b. one or more elements selected from group VIB of the periodic table such as one or two metals selected from the group of Cr, Mo, W
c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

In a preferred embodiment according to the present invention the heterogeneous catalyst in the first reaction zone may further comprise one or more elements selected from Ce, Ti, Zr, B, Bi, Cu, Na, K, Mg.

It is generally preferred that acidity of said supporting structure is low to moderate in order to minimize undesired reactions such coke formation and/or polymerization reactions. In some applications of the present invention the number of acidic sites on the catalyst support may be reduced by reacting the acidic sites with a suitable base such as sodium hydroxide or potassium hydroxide prior to drying.

Advantageous embodiments of the present invention include supporting structures comprising Ce. It has been found the Ce reduces coke formation and enables higher loadings of active catalyst elements.

The catalyst in the first reaction zone may comprise other elements in trace amounts.

Particularly preferred support for use in said first reaction zone according to the present invention include alumina such as γ-alumina or δ-alumina, silica, stabilized alumina, silicate and alumosilicate such as MCM-41, silicoaluminophosphates (SAPO), aerogirine, ceria, zirconia, titania, activated carbon and hydrotalcite supports and combinations thereof.

Further, some of the compounds of the oxygen containing renewable crude oil comprises relative large molecules so as in the range up to 50-100 nm. Such molecules are too big to penetrate the smallest pores of some high surface area catalyst supports commercially available, and may lead to deactivation of the catalyst due to pore plugging. In addition too many small pores leads to too much gas production from lighter compounds and therefore reduces the yield of desired products.

Hence, according to an embodiment of the present invention the support structure for the heterogeneous catalyst has few micropores with pore size less than 20 Angstrom, a large amount of mesopores in the range 20 to 500 Angstrom and some macropores with a pore size larger than 500 Angstrom.

A preferred embodiment of the present invention comprises a support structure for the heterogeneous catalyst having an average pore size as measured by Hg porosimetry and/or $N_2$ adsorption at 77 K in the range from about 20 to about 10000 Angstrom such as in the range from about 30 to about 1000 Angstrom, preferably said average pore size of the support structure of heterogeneous catalyst in the first reaction zone is in the range from about 30 to about 500 Angstrom such as in the range from about 50 to about 500 Angstrom.

A further preferred embodiment of the present invention comprises a support structure for the heterogeneous catalyst having a BET surface as measured by $N_2$ adsorption at 77K in the range 20 to about 500 $m_2/g$ such as in the range 20 to 250 $m_2/g$, preferably the support has a surface area (BET) in the range in the range 30 to 150 $m_2/g$ such as in the range 40 to 120 $m_2/g$, even more preferably the support has a surface area (BET) in the range 60 to 120 $m_2/g$ such as in the range 60 to 100 $m_2/g$.

The pore density of the support structure for the heterogeneous catalyst in as measured by $N_2$ adsorption at 77K is typically in the range 0.3 to 0.9 cc/g such as in the range 0.4 to 0.85 cc/g, preferably the pore density is in the range 0.4 to 0.65 cc/g such as in the range 0.45 to 0.6 cc/g.

Hydrogen is generally added to the renewable crude oil after pressurization to the desired operating pressure to stabilize the renewable crude oil during heating to the operating temperature of the first reaction zone, but may also be at least partly added to the reactor(-s) in the first reaction zone.

The amount of hydrogen consumed in the first reaction zone is in a preferred embodiment in the range 0.5 to 6.0% of the weight of the renewable crude oil such as in the range 0.7 to 4.0% of the weight of the renewable crude oil. In an advantageous embodiment the hydrogen consumption in he first reaction zone is in the range 1.5 to 3.0% of the weight of the renewable crude oil.

The amount of hydrogen added to the renewable crude oil in the first reaction zone is typically in excess of the stoichiometric amount required by the reactions in the first reaction zone. In a preferred embodiment of the present invention the amount of hydrogen added in the first reaction zone is up to 10 times higher than the stoichiometric amount of hydrogen required by the reactions such as up to 5 times higher than the stoichiometric amount of hydrogen, preferably the the amount of hydrogen added is in the range of 1.5 to 5 times higher than the stoichiometric amount of hydrogen such as in the range 2 to 5 times higher than the stoichiometric amount of hydrogen consumed in the first reaction zone.

The heterogeneous catalyst(-s) in the first reaction zone may be in any known form or shape such as in the form of tablets, cylinders, hollow cylinders extrudates, powder, beads, monolithic structure or a combination thereof.

The heterogeneous catalyst(-s) in the first reaction zone may be contained in one or more fixed beds, one or more ebullated beds, one or more slurry beds or a combination thereof.

A preferred embodiment according to the present invention comprises one or more fixed beds.

A further preferred embodiment is where the first reaction zone comprises two or more reactors and where produced gases and water are separated from the partially upgraded renewable oil prior to the last reactor of the first reaction zone. Hereby an increase activity of the catalyst in the last reactor of the first reaction zone can be obtained, and a deeper hydrooxygenation of e.g. phenols can be obtained.

In many embodiments of the present invention, a reduction of carboxylic acids of about 80 to 100% and a phenols reduction of at least 10 to 50% is typically obtained in the first reaction zone. The partially upgraded oil obtained from reaction zone 1 may contain an oxygen content in the range of 0,0 to 7 wt. % and TAN between 0.0 to 3 mg KOH/g oil. Furthermore, the partially upgraded renewable oil may have a viscosity in the range of 900 to 1400 cP at 40° C.

By the hydrodeoxygenation of carboxylic acids, esters, ketones, aldehydes and phenols in the renewable crude oil in the first reaction zone according to the present invention, a reduction and/or elimination the number of reactive species such as carboxylic acids and/or ketones and/or phenols and/or other oxygenates and/or unsaturated compounds and/or aromatic compounds is obtained whereby the risks of polymerization and/or coking and/or poisoning and/or clogging of the heterogeneous catalysts are minimized, thereby resulting in a more effective and economical process with a higher onstream factor.

Separation After First Reaction Zone

The partially upgraded product from the first reaction zone is according to the invention separated into a gas phase, a water phase, a low boiling ("light") fraction and a high boiling ("heavy") fraction. In a preferred embodiment of the present invention the separation may comprise two or more separation steps such as a first flash separation step, separating the product from the reaction zone into a partially upgraded heavy oil stream and a phase comprising partial upgraded light oil, gas and water, and where the partially upgraded light oil, gas and water are further separated in a second separation step such as a flash and/or gravimetric phase separator.

The cut point of said separation may according to certain preferred embodiments be selected so as to produce a separated partially upgraded light oil fraction having a boiling point of up to 350° C. such as a boiling point of up to 300° C. Preferably, the partially upgraded light fraction has a boiling point of up to 270° C. such as up to 250° C.

A preferred embodiment of the present invention include where the separation comprises one or more flash separation, condensing and gravimetric separation step(-s).

Second Reaction Zone

The second reaction zone according to the invention has a dual function and comprises reactor(-s) in two different operational modes:

1. The separated high boiling fraction of the partially upgraded renewable oil from the first reaction zone is being converted into lighter (lower boiling point e.g. in the jet & diesel range) and more saturated compounds by catalytic steam conversion and/or catalytic steam cracking reactions, which uses steam as source of hydrogen, and generates excess hydrogen;
2. Hydrogen is produced from separated process gas from the first reaction zone and/or the second reaction zone and/or from the step of providing the renewable oil and/or from further treatment steps downstream of the second reaction zone, while regenerating the activity of the dual functioning heterogeneous catalyst(-s) for further catalytic steam conversion and/or catalytic steam cracking operation.

Figure 3:
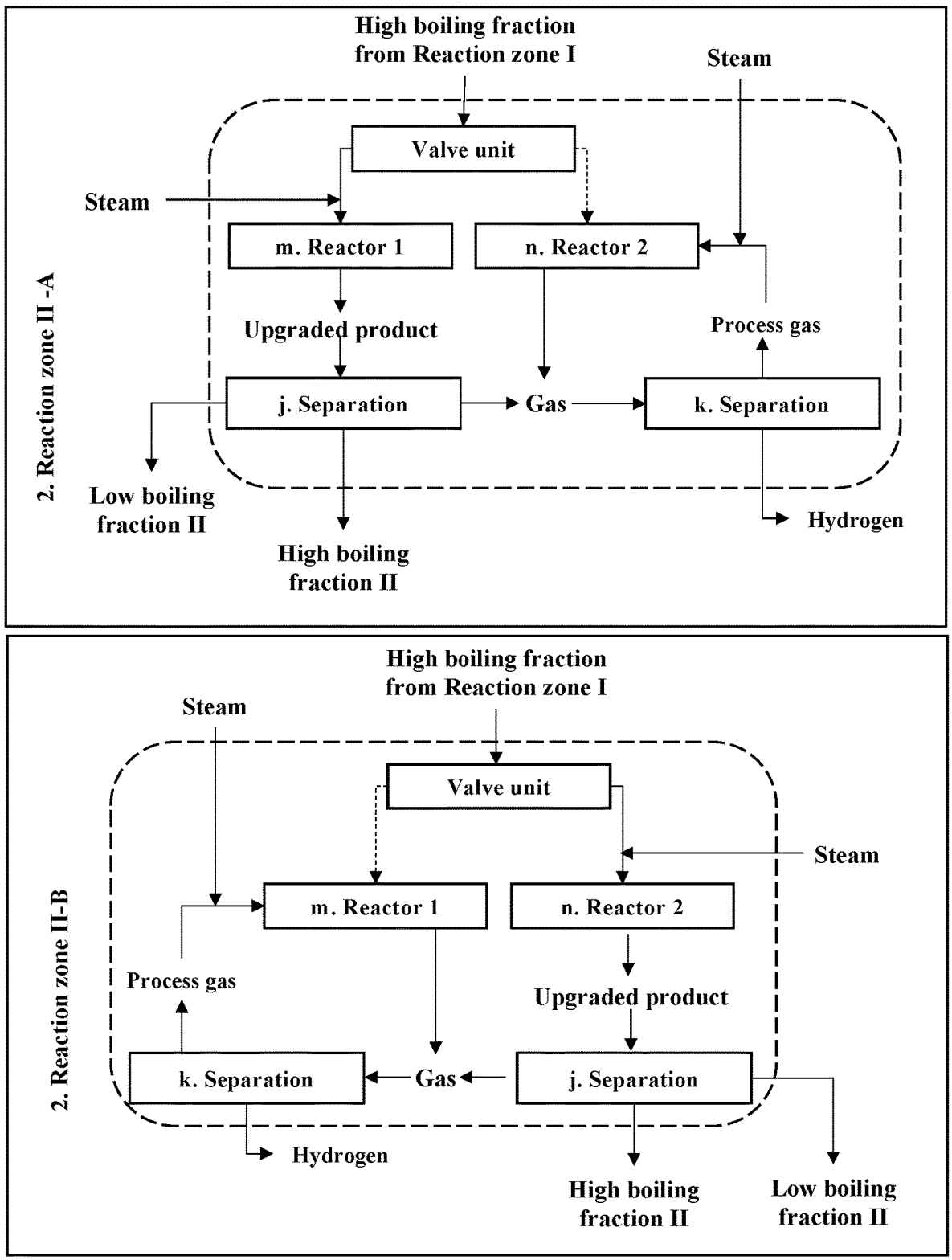
FIG. 3 shows the operational modes of the reactors in the second reaction zone according to a preferred embodiment of the present invention in further details.

Hence, according to present invention the high boiling (heavy) fraction of the separated partially upgraded renewable oil from the first reaction zone is further treated in a second reaction zone comprising at least two reactors arranged in parallel and both containing dual functioning heterogeneous catalyst(-s) capable of performing both a catalytic steam cracking/catalytic steam conversion and a steam reforming reaction of the gases, and adapted to operate in a first and a second mode of operation as illustrated in FIG. 3.

The top figure show a mode where the high boiling fraction of the separated partially upgraded renewable oil is directed to one or more reactors being in the first mode of operation (reactor 1), where it is contacted with the dual functioning heterogeneous catalyst(-s) and steam, while at least one of the reactors arranged in parallel (reactor 2) is adapted for operation in the second mode of operation for regeneration by steam reforming of separated process gas from the first reaction zone and/or the second reaction zone and/or from the step of providing the renewable crude oil and/or from optional downstream processing steps. The separated process gas(-es) is directed to the reactor(-s) being in the second operation mode where it is contacted with steam and the dual functioning heterogeneous catalyst to be regenerated, thereby producing a hydrogen enriched gas while regenerating the heterogeneous catalyst for further use in the first mode of operation.

Hydrogen is extracted from the resulting hydrogen enriched gas produced in the second reaction zone in the separation step, and recycled to the first reaction zone as shown in FIG. 2. The hydrogen may in some embodiments be recompressed prior to entering the first reaction zone.

Optionally water and/or $CO_2$ may also be separated from the process gas(-ses) prior to entering the second mode of operation of the reactors in the second reaction zone.

Suitable methods for the separation of hydrogen from the reformed gas includes membrane separation, pressure swing adsorption and absorption techniques e.g. using an amine such as MEA as absorbent.

A valve unit located prior to the reactors and a valve unit located after the reactors, controls which reactor(-s) are in the first mode for catalytic steam conversion/catalytic steam cracking operation, and which reactor(-s) are in the second steam reforming operation mode as shown in FIG. 2. The valve units further controls alternation between the first mode of operation and the second mode of the operation of the reactors at predefined time intervals. The bottom figure in FIG. 3 shows the situation where the reactors in reaction zone 2 have been alternated i.e. the reactors that previously were in the first mode of operation (reactor 1) in the top figure are now operating in the second mode of operation, while the reactors that was previously operating in the second mode of operation in the top FIG. 20 (reactor 2) is now operating in the first mode of operation.

By treating the separated high boiling fraction from the second reaction zone separately from the low boiling fraction from the second reaction zone, it is obtained that the low boiling fraction not becomes too light and eventually ends up as gas i.e. the yields of the jet and diesel fractions are maximized.

Hence, the second reaction zone according to the present invention results in higher yields of desired lighter products, longer operational time and an upgrading process requiring less or no external hydrogen i.e. an overall process which are more efficient, economical and environmentally sustainable.

Often the amount of hydrogen extracted from the second reaction zone according to the present invention comprises at least 50% of the total hydrogen required by the partial upgrading process in the first reaction zone such as at least 60% of the total hydrogen required by the partial upgrading process in the first reaction zone. Preferably the amount of hydrogen extracted from the second reaction zone according to the present invention comprises at least 70% of the total hydrogen required by the partial upgrading process in the first reaction zone such as at least 80% of the total hydrogen required by the partial upgrading process in the first reaction zone. In a further preferred embodiment substantially all of hydrogen required by the upgrading process is produced and extracted from the second reaction zone such as at least 90% of the hydrogen consumed by said upgrading process in the first reaction zone. In an advantageous embodiment the amount of hydrogen extracted exceeds the amount of hydrogen added to the upgrading process.

Thereby the need for external hydrogen and/or the scale and/or the need for a hydrogen plant is eliminated or significantly reduced. As hydrogen constitutes a major part of the upgrading process costs, a significant economical advantage is obtained. Further as the hydrogen extracted from process is produced from renewable resources the carbon footprint of the upgraded products is significantly reduced. As the key driver for renewable products is reduce the carbon footprint this is a key element.

The carbon foot print of the upgraded products produced by the upgrading process according to the present invention is at least 60% less than the fossil equivalents such as at least 70% less than the fossil equivalents; in a preferred embodiment according to the present invention the carbon foot print of the upgraded products is at least 80% less than the fossil equivalents such as at least 90% less than the fossil equivalents; in an advantageous embodiment the carbon foot print of the upgraded products produced by the upgrading process is at least 100% less than the fossil equivalent such as least 110% less than its fossil equivalent.

First Mode of Operation of the Reactors in the Second Reaction Zone

The operating pressure of the reactors being online in the second reaction zone is typically lower than the operating pressure in the first reaction zone such as below 150 bar. In the first mode of operation the operating pressure of the reactor(-s) in the second reaction zone is/are according to a preferred embodiment of the present invention below 130 bar such as below 100 bar. Advantageously the operating pressure of the reactors being in the first mode of operation in the second reaction zone is/are below 80 bar such as below 60 bar.

According to a preferred embodiment the operating pressure of the reactors being in the first mode of operation in the second reaction zone is at least 10 bar such as an operating pressure of at least 20 bar; Preferably the operating pressure of the reactors being in the first mode of operation in the second reaction zone is at least 30 bar such as an operating pressure of at least 40 bar. In an advantageous embodiment of the present invention the operating pressure of the reactors being in the first mode of operation in the second reaction zone is in the range 10 to 60 bar such as in the range 20 to 40 bar.

The operating temperature of the reactor(-s) being the first mode of operation in the second reaction zone performing a catalytic steam conversion and/or catalytic steam cracking of the separated high boiling fraction of the partially upgraded renewable oil is/are typically in the range 350° C. to 430° C. In many applications of the present invention the operating temperature of the reactor(-s) being online in the second reaction zone is in the range 360 to 410° C. such as in the range 360 to 400° C.; preferably the operating temperature of the reactor(-s) being in the first mode of operation in the second reaction zone is/are in the range 370 to 400° C., such as in the range 370 to 390° C.

The weight based hourly space velocity (WHSV) in the reactor(-s) being in the first mode of operation in the second reaction zone may according to an embodiment of the present invention be in the range 0.1 to 1.5 $hours_{-1}$ such as in the range 0.1 to 1.0 $hours_{-1}$, preferably the weight hourly space velocity in the reactor(-s) being in the first mode of operation in the second reaction zone is/are in the range 0.2 to 0.5 $hours_{-1}$ such as in the range 0.25 5 to 0.5 $hours_{-1}$.

Steam is injected to the separated high boiling part of the partially upgraded oil or directly into the reactor(-s) being in the first mode of operation in the second reaction zone. The amount of steam injected in the reactor(-s) being in the first mode of operation in the second reaction zone is/are often in the range 5.0 to 35% by weight of the partially upgraded renewable oil such as in the range 5.0 to 30% by weight of the partially upgraded renewable oil, preferably the amount of steam being injected in the the first mode of operation of the reactor(-s) in the second reaction zone is in the range 5.0 to 25% by weight of the high boiling fraction of the partially renewable oil being treated such as in the range 5.0 to 20%. Even more preferably the amount of steam being injected is in the range 5.0 to 15% by weight of the separated high boiling fraction of the partially upgraded renewable oil being treated such as in the range 5.0 to 10%.

Second Mode of Operation of the Reactors in the Second Reaction Zone

In the second mode of operation, the dual functioning heterogeneous catalyst in the reactor(-s) is being regenerated while a hydrogen enriched gas is produced by reforming of process gas from the first reaction zone and/or the second reaction zone and/or from the step of providing the renewable and/or from further treatment steps downstream of the second reaction zone.

Steam for the reforming reactions is injected to the reactor(-s) or to the gas prior to entering the reactor(-s) being in the second mode of operation in the second reaction zone. The mass ratio of the steam to the gas injected is typically in the range 0.01 to 1.0. Preferably the mass ratio of the steam to the gas injected is in the range 0.01 to 0.33.

The operating pressure of the reactor(-s) being in the second mode of operation in the second reaction zone performing reforming of process gas is typically from 0.1 bar to 10 bar such as in the range 0.3 to 5.0 bar; Preferably operating pressure of the reactor(-s) being in the second mode of operation in the second reaction zone in the range 0.5 to 3 bar such as in the range 0.5 to 2 bar.

The operating temperature of the of the reactor(-s) being in the second mode of operation in the second reaction zone during the reforming of process gas is according to the invention typically in the range 350 to 650° C. such as in the range 360 to 600° C., advantageously the operating temperature of the reactor(-s) being offline in the second reaction zone during the reforming of process gas is in the range 370 to 550° C. such as in the range 390 to 470° C. This range of operating temperatures for the reforming of the process gas while regenerating the catalyst is considerably lower than normal operating temperatures for reforming reactions and by keeping the operating temperature below the calcination temperature it is obtained that the pore size and surface area and thus the catalyst activity are substantially maintained.

The weight based hourly space velocity in the reactor(-s) being in the second mode of operation in the second reaction zone is/are in the range 0.1 to 2.0 $hours_{-1}$ such as in the range 0.15 to 1.0 $hours_{-1}$. In a preferred embodiment the weight based hourly space velocity in the reactor(-s) being in the second mode of operation in the second reaction zone is/are in the range 0.15 to 0.5 $hours_{-1}$.

The steam/carbon molar ratio in the reactor(-s) being in the second mode of operation in the second reaction zone is often in the range between 1 to 30, preferably in the range of 2 to 20, such as 3 to 10.

Dual Functioning Heterogeneous Catalyst(-s) in the Second Reaction Zone

The dual functioning heterogeneous catalyst(-s) used in the reactors of the second reaction zone typically has a water splitting functionality for performing a catalytic steam conversion and/or catalytic steam cracking of said partially upgraded renewable oil while being in the first mode of operation. The catalytic steam conversion and/or catalytic steam cracking use steam as source of hydrogen, and generates excess hydrogen which may be recovered, compressed and recycled to the first reaction zone after separation from the upgraded oil or being mixed with other process gasses and be reformed in the second mode of operation of the reactors in the second reaction zone. Without wishing to be bound to a specific theory it is believed that the catalytic steam conversion and/or catalytic steam cracking is due to oxygen deficiencies and/or vacancies at the surface of the heterogeneous catalyst(-s). The partially upgraded oxygen containing renewable crude oil may be adsorbed to the surface of the heterogeneous catalyst and may react with oxygen on the surface of the heterogeneous catalyst thereby forming $CO_2$. Water may be adsorbed and dissociated to/at the oxygen vacancy at the surface of the heterogeneous catalyst thereby renewing the oxygen on the surface, while producing hydrogen. Depending on the specific catalyst and operating conditions the hydrogen may further react with the partially oil or may be recovered from said gas phase after separation and introduced for the reactions in the first reaction zone, thereby reducing the amount of external hydrogen required for the process and thereby resulting in a more efficient and economic process with a lower carbon footprint than the prior art.

The heterogeneous catalyst applied for the catalytic steam conversion is also active for reforming of process gas by reaction with steam i.e. it has a dual function. During this reforming coke and/or other carbon on the heterogeneous catalyst also reacts and the catalyst is being regenerated.

The dual functioning heterogeneous catalyst in the second reaction zone is according to a particularly preferred embodiment of the present invention a bimetallic or trimetallic catalyst supported on a supporting structure, and where said catalyst and/or catalyst elements comprises a. One or two transition metals selected from the group VIIIB of the periodic table of elements such as one or two metals selected from Fe, Co, Ni, Ru, Rh, Pd, Os, Ir, Pt.

b. One or more catalyst(-s) or catalyst(-s) selected from the group VIB of the periodic table of elements such as an element selected from Cr, Mo, W c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon, zeolites or a combination thereof.

A further preferred embodiment of the dual functioning heterogeneous catalyst in the second reaction zone is, where said heterogeneous catalyst in the second reaction zone comprises or further comprises one or more elements selected from the group of Ce, Ti; Zr, B, Ga, Cu, P, Bi, Na, K, Mg. Other transition metals may also be present in trace amounts.

According to many embodiments of the present invention said one or more elements or further elements may be present in a concentration of the element in the range 1.0 wt. % to about 25.0 wt. % such as a concentration of said further catalyst element(s) is in the range from about 2.0 wt. % to about 25.0 wt. %. Preferably, said element or further element (-s) is present in the range from about 5 wt. % to about 20 wt % such as in the range from about 10 wt % to about 20 wt. %.

In other embodiments according to the present invention, the concentration of said one or more elements or further element(-s) may be in the range from about 0.5 wt. % to about 10 wt. % such as in the range from about 1.0 wt. % to about 7.0 wt. %. Preferably, said further element(-s) is in the range from about 1.5 wt. % to about 5 wt. %.

Advantageously said supporting oxide or hydroxide structure comprises Ce, Zr, Al, Sc, Yt, Yb, Mg, Ni, Fe and/or Pt or a combination thereof.

A particular advantageous supporting structure comprises a layered double hydroxide such as a hydrotalcite.

The hydrotalcite may comprise Mg and/or Ca and/or Ni and/or Co and/or Mn and/or Cr and/or Al and/or Fe and/or Ce or a combination thereof.

A particularly preferred embodiment according to the present invention is where said heterogeneous catalyst and/or supporting structure has the empirical formula $M(II)6M(III)2(OH)16.CO_3.4H_2O$, where M(II) is a divalent metal ion comprising one or two elements selected from the group of Mg, Ca, Ni, Co, Cu, Mn, Zn, Fe and M(III) is a trivalent metal ion comprising one or two elements selected from the group of Al, Fe, Co, Ni, Cr, Bi, Mn, Ce, Ga.

Further, a preferred embodiment is where said heterogeneous catalyst and/or supporting structure has empirical formula $Mg_xNi_yFe_zCe_wAl_q(OH)_{16}.CO_3.4H_2O$, where x: 1.0-2.0, y: 4.0-5.0, z:0.0-1.0, w: 0.0-1.0, q: 1.0-2.0 such as $Mg_{4.3}Ni_{1.70}CeAl(OH)_{16}.CO_3.4H_2O$.

A further preferred embodiment according to the invention is where the heterogeneous catalyst and/or supporting structure comprises $Mg_{4.3}Ni_{1.70}CeAl(OH)_{16}.CO_3.4H_2O$.

According to a preferred embodiment said bimetallic or trimetallic catalyst is preferably on a sulphide form, on a carbide, a carbonate, a phosphide, a phosphate, a nitride, a boride form, an oxide form, and/or a hydroxide form and/or a combination of these.

Some of the compounds in the heavy fraction of the partially upgraded renewable crude oil comprises relative large molecules so as in the range up to 50-100 nm. Such molecules are too big to penetrate the smallest pores of some high surface area catalyst supports commercially available, and may lead to deactivation of the catalyst due to pore plugging. In addition too many small pores leads to too much gas production from lighter compounds and therefore reduces the yield of desired products.

Hence, according to an embodiment of the present invention the dual functioning heterogeneous catalyst in the second reaction zone has few micropores with pore size less than 20 Angstrom, a large amount of mesopores in the range 20 to 500 Angstrom and some macropores with a pore size larger than 500 Angstrom.

A preferred embodiment of the present invention comprises a dual functioning heterogeneous catalyst having an average pore size as measured by Hg porosimetry and/or $N_2$ adsorption at 77 K in the range from about 20 to about 10000 Angstrom such as in the range from about 30 to about 1000 Angstrom, preferably said average pore size of the support structure of heterogeneous catalyst in the first reaction zone is in the range from about 30 to about 500 Angstrom such as in the range from about 50 to about 500 Angstrom.

A further preferred embodiment of the present invention comprises a dual functioning heterogeneous catalyst having a BET surface as measured by $N_2$ adsorption at 77K in the range 20 to about 500 $m_2/g$ such as in the range 20 to 250 $m_2/g$, preferably the support has a surface area (BET) in the range in the range 30 to 150 $m_2/g$ such as in the range 40 to 120 $m_2/g$, even more preferably the support have a surface area (BET) in the range 60 to 120 $m_2/g$ such as in the range 60 to 100 $m_2/g$.

The pore density of the dual functioning heterogeneous catalyst in the second reaction zone as measured by $N_2$ adsorption at 77 K is typically in the range 0.3 to 0.9 cc/g such as in the range 0.4 to 0.85 cc/g, preferably the pore density is in the range 0.4 to 0.65 cc/g such as in the range 0.45 to 0.6 cc/g.

Separation of Upgraded Oil from the Second Reaction Zone

The upgraded product from the second reaction is subsequently separated into a gas phase, a water phase, a low boiling ("light") oil fraction and a high boiling fraction ("heavy") fraction. The separated gas is typically mixed with the process gas from the first reaction zone and used to produce hydrogen by reforming in the reactor(s) being offline in the second reaction zone.

The cut point (boiling point) between the light and the heavy fraction may in many applications be selected as up to 450° C. such as up 400° C. In a preferred embodiment according to the present invention the cut point between the light and he heavy fraction is up to 370° C. such as up to 350° C.

The separation of the products from the reactor(-s) being online in the second reaction zone is according to a preferred embodiment performed in separation system comprising a hot high pressure separator and a hot low pressure separator.

The operating temperature of the hot high pressure separator is in many applications be in the range 270 to 400° C. such as in the range 300-370° C.

The operating pressure of the hot high pressure separator is typically in the range 50-130 bar such as in the range 60-100 bar.

The operating temperature of the hot low pressure separator is typically in the range 270-400° C. such as in the range 300 to 370° C. Preferably the operating temperature of the hot low pressure separator is in the range 300-350° C. such as in the range 300 to 330° C.

The pressure of the hot low pressure separator is typically in the range 0.1-6 bar such as in the range 1.5-5 bar.

Light Fraction

Figure 4:
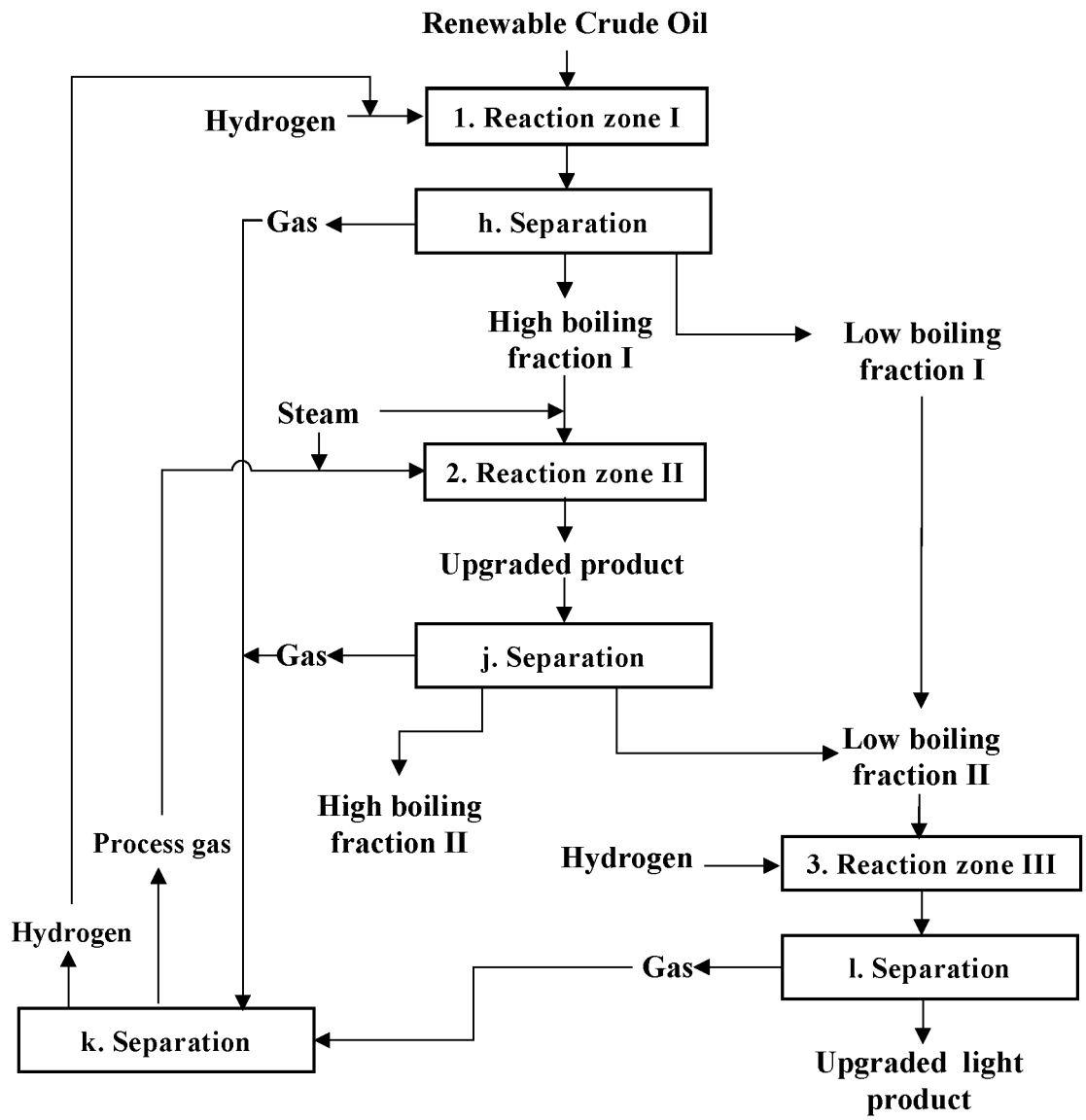
FIG. 4 shows an advantageous embodiment of a catalytic process for upgrading renewable oil further comprising a third reaction comprising a third reaction zone for treating lights from the first reaction zone and the second reaction zone.

The light fractions from the first and the second reaction zone may optionally be subjected to a further hydroprocessing treatment in a third reaction zone e.g. to perform hydrogenation and isomerization reactions such as de-aromatization and/or saturation of double bonds of the light fractions of the renewable oil fraction from the first reaction zone and the second reaction zone as shown in FIG. 4.

In a preferred embodiment of the invention the operating temperature of the third reaction zone is controlled to be less than 420° C., such as less than 410° C. Preferably the operating temperature of the third reaction zone is below 390° C., such as below 380° C. A preferred embodiment comprises an operating temperature of the third reaction zone in the range 350-420° C., such as an operating temperature in the range 350-410° C. such as in the range 350-390° C.

The weight based hourly space velocity in said third reaction zone may according to an embodiment of the present invention be in the range in the range 0.1 to 1.5 hours$_{-1}$ such as in the range 0.1 to 1.0 hours$_{-1}$, preferably the weight based hourly space velocity in said third reaction zone is in the range 0.2 to 0.8 hours$_{-1}$ such as in the range 0.2 to 0.7 hours$_{-1}$.

The operating pressure in the third reaction zone may be at least 60 bar such as an operating pressure of at least 80 bar; preferably the operating pressure of the third reaction zone is at least 90 bar such as an operating pressure of at least 100 bar.

Further according to a preferred embodiment of the invention the operating pressure in the third reaction zone may be below 200 bar such as an operating pressure in the third reaction zone below 150 bar; Preferably the operating pressure of the third reaction zone is below 130 bar such as below 120 bar.

The heterogeneous catalyst used in the third reaction zone may be substantially the same as described and used in the first reaction zone.

The effluent from the third reaction zone may be separated into at least a gas phase and a renewable oil phase. The renewable oil phase from the third reaction zone may be further separated e.g. into naphtha range hydrocarbons, kerosene hydrocarbons, diesel range hydrocarbons and eventually gas oil.

Heavy Fraction

The separated heavy fraction from the second reaction zone may be used directly e.g. as a blendstock for marine fuels and/or for heating applications and/or as an interim product for production of biolubricants, and/or speciality oils such as transformer oils an/or fine chemicals such as bio-aromatics and/or precursors for bio-plastics.

However, in some embodiments according to the present invention the heavy fraction may be subjected to a further treatment such as a hydrocracking step in a fourth reaction zone.

EXAMPLES

Renewable crude oil was upgraded by hydroprocessing in a first reaction zone followed by catalytic steam cracking in the second reaction zone.

A series of experiments including parametric screening of process conditions were performed. The experiments were carried out in a continuous bench scale pilot-plant unit, using an up-flow tubular reactor in order to ensure an isothermal zone suitable to accommodate the catalytic bed.

Three independent heating zones where used to ensure an isothermal profile in the catalyst bed. Independent on the process configuration the reactor allocates three sections including pre-heating zone, catalysts bed (isothermal zone) and outlet zone. The pre-heating and outlet zone was filled with a silicon carbide inert material, and the catalyst was placed in the isothermal zone.

The catalyst bed was first dried in a nitrogen atmosphere at temperatures in the range of 100-130° C., and subsequently activated by reduction in a hydrogen atmosphere at temperature around 500-550° C. at atmospheric pressure.

The quality of the partially upgraded renewable oil was evaluated by total acid number (TAN), viscosity, microcarbon residue (MCR), Fourier Transformed Infrared Analysis (FTIR), oxygen content and liquid product distribution.

Example 1

Reaction Zone 1—Screening Hydrotreatment Processes

About 10 g of a customized highly dispersed molybdenum carbide heterogeneous catalyst was placed in the isothermal zone of reaction zone 1. The renewable crude oil was pre-heated to about 90-100° C., mixed with hydrogen and and directed to the reactor at the desired flow.

The weight based hourly space velocity (WHSV) was varied in the range 0.2 to 0.5 h$_{-1}$, and the flow of hydrogen from 300 to 1300 SCC $H_2$/CC of oil. The operational temperature of the isothermal zone containing the heterogeneous catalyst were varied in the range from 280 to 310° C., and the operating pressure in the reactor was varied in the range from 62 to 100 bar.

The results from variation of the temperature at a constant operating pressure of 62 bar, constant $H_2$/oil ratio of 900 SCC/CC oil and a weight based space velocity of 0.4 hours$_{-1}$ is shown below in table 1 and 2.

TABLE 1

Physicochemical properties of renewable crude oil and partially upgraded oil after the first reaction zone

| Temperature [° C.] of reaction zone 1 | TAN [mg KOH/g oil] | Viscosity @ 40° C. [cP] | MCR [reduction %] | $H_2O$ yield [g $H_2O$/g oil] |
|---|---|---|---|---|
| Renewable crude oil | 51.49 | 7949 | 17.01 | |
| 280 | 27.98 | 4453 | 12.57 | 0.0314 |
| 300 | 25.79 | 3167 | 13.45 | 0.0377 |
| 310 | 27.87 | 3174 | — | 0.0423 |

Tests performed at WHSH: 0.4 $h_{-1}$, $H_2$/oil ratio: 900 and pressure: 62 bar.

TABLE 2

Gas composition HTD screening tests

| | Reaction temperature [° C.] | | |
|---|---|---|---|
| Sample | 280 | 300 | 310 |
| $H_2$ | 99.88 | 99.69 | 99.52 |
| $CH_4$ | 0.07 | 0.18 | 0.22 |
| CO | 0 | 0.03 | 0.06 |
| $CO_2$ | 0.04 | 0.07 | 0.10 |
| Ethylene | 0 | 0 | 0 |
| Ethane | 0.01 | 0.04 | 0.05 |
| Buthane | 0.0 | 0.0 | 0.10 |

As seen from the table, increasing the operating temperature of the first zone increases the gas and water yields. This may be explained by higher reaction rates of decarboxylation/methanation and hydrodeoxygenation/dehydration reactions. As a result the viscosity, MCR and TAN are reduced by increasing the operating temperature (Table 1). The presence of buthane at reactions performed at 310° C. indicates that cracking reactions are taking place (Table 2).

Table 3 shows the effect of the weight based space velocity on the oil properties.

TABLE 3

Physicochemical properties of partially upgraded oil, WHSV effect

| WHSV [$h_{-1}$] | TAN [mg KOH/g oil] | Viscosity @ 40° C. [cP] | MCR [reduction %] | $H_2O$ yield [g $H_2O$/g oil] | $H_2$ cons. [g $H_2$/g oil] |
|---|---|---|---|---|---|
| Renewable crude oil | 48.7 | 6027 | 17.01 | — | — |
| 0.4 | 25.79 | 3167 | 13.45 | 0.0377 | $3.19 \times 10_{-3}$ |
| 0.25 | 20.35 | 3556 | 9.35 | 0.0427 | $3.33 \times 10_{-3}$ |

Testes performed at temperature: 300° C., $H_2$/oil ratio: 900 and pressure: 62 bar.

As seen from table, the weight based space velocity (WHSV) plays a significant role for the hydrotreating reactions in the first reaction zone. Lower space velocities favors hydro-decarboxylation reactions thereby enhancing the reduction of the Total Acid Number (TAN) and promoting a deeper hydrogenation of the renewable crude oil as evidenced by the microcarbon residue (MCR) reduction observed in Table 3. Additionally, the yield of water produced increased at the lower space velocity indicating a higher hydro-deoxygenation of the renewable crude oil.

Hydrotreating reactions should preferably occur in a hydrogen rich environment, therefore hydrogen availability in the reaction media was evaluated. The results are shown in table 4.

TABLE 4

Physicochemical properties of the partially upgraded oil, $H_2$-to-oil ratio effect

| Reaction temperature [° C.] | $H_2$/oil Ratio | TAN [mg KOH/g oil] | Viscosity @ 40° C. [cP] | MCR [reduction %] |
|---|---|---|---|---|
| — | Biocrude | 49.1 | 6027 | 20.49 |
| 280 | 300 | 32.0 | 5836 | 19.17 |
| | 600 | 29.2 | 5957 | 18.91 |
| | 900 | 26.7 | 6078 | 19.94 |
| 300 | 300 | 30.2 | 2739 | 18.61 |
| | 600 | 26.4 | 4429 | 18.49 |
| | 900 | 24.2 | 4146 | 18.62 |

Testes performed at temperature: 300° C., WHSV: 0.25 $h_{-1}$ and pressure: 62 bar.

As seen from the results in table 4 decreasing the $H_2$/oil ratio from 900 to 600 and 300 SCC/CC increases the total acid number (TAN) by 5% and 16%, respectively, compared to the TAN reduction at a $H_2$/oil ratio of 900 SCC/CC. Therefore, the oxygen reduction appears to be $H_2$/oil ratio dependent. Moreover, at higher $H_2$/oil ratio, i.e. 900, hydrogenation of aromatics compounds are favored thus reducing the viscosity.

Sufficiently high operating pressure ensure higher hydrogen solubility in the renewable crude oil and thereby higher hydrogen availability in the vicinity of the heterogeneous catalyst. The effect of operating pressure is shown below in table 5.

TABLE 5

Physicochemical properties of partially upgraded oil, Pressure effect

| Reaction pressure [bar] | TAN reduction [%] | Viscosity reduction [%] | DOD* [%] | H₂O yield [g H₂O/g oil] | H₂ cons. [mg H₂/g oil] |
|---|---|---|---|---|---|
| 62 | 55.7 ± 2.8 | 20.1 ± 1.0 | 32.1 ± 0.1 | 0.043 | 4.8 |
| 96.5 | 67.9 ± 3.4 | 27.8 ± 1.4 | 37.1 ± 0.1 | 0.045 | 5.3 |

Testes performed at temperature: 300° C., WHSV: 0.25 $h_{-1}$ and H₂/oil ratio: 900.

$$*DOD = \left(1 - \frac{\text{wt. \% Oxygen in product}}{\text{wt. \% Oxygen in feed}}\right) \times 100$$

Table 5 shows that a significant TAN reduction is observed at the higher operating pressure tested (i.e. 96.5 bar), indicating that further hydro-treating reactions taken place at the higher operating pressure. Moreover, the increase of the hydrogen consumption indicate higher hydrotreating levels and therefore, that the degree of deoxygenation increases.

Example 2

Combined Effect of Process Conditions in First Reaction Zone

More severe operation conditions in reaction zone 1 were tested subsequent to the screening tests described in example 1 with the aim of further reduction of biocrude TAN and phenols. The operating conditions studied are presented in table 6.

TABLE 6:

| HDT process conditions tested | | | | | |
|---|---|---|---|---|---|
| Temperature [° C.] | 300 | 300 | 310 | 310* | 320* |
| WHSV [$h_{-1}$] | 0.25 | 0.25 | 0.2 | 0.2* | 0.2* |
| Pressure [bar] | 62 | 96.5 | 96.5 | 96.5* | 96.5* |
| H₂/oil ratio [scc/cc] | 900 | 900 | 900 | 900 | 900 |

Figure 5:
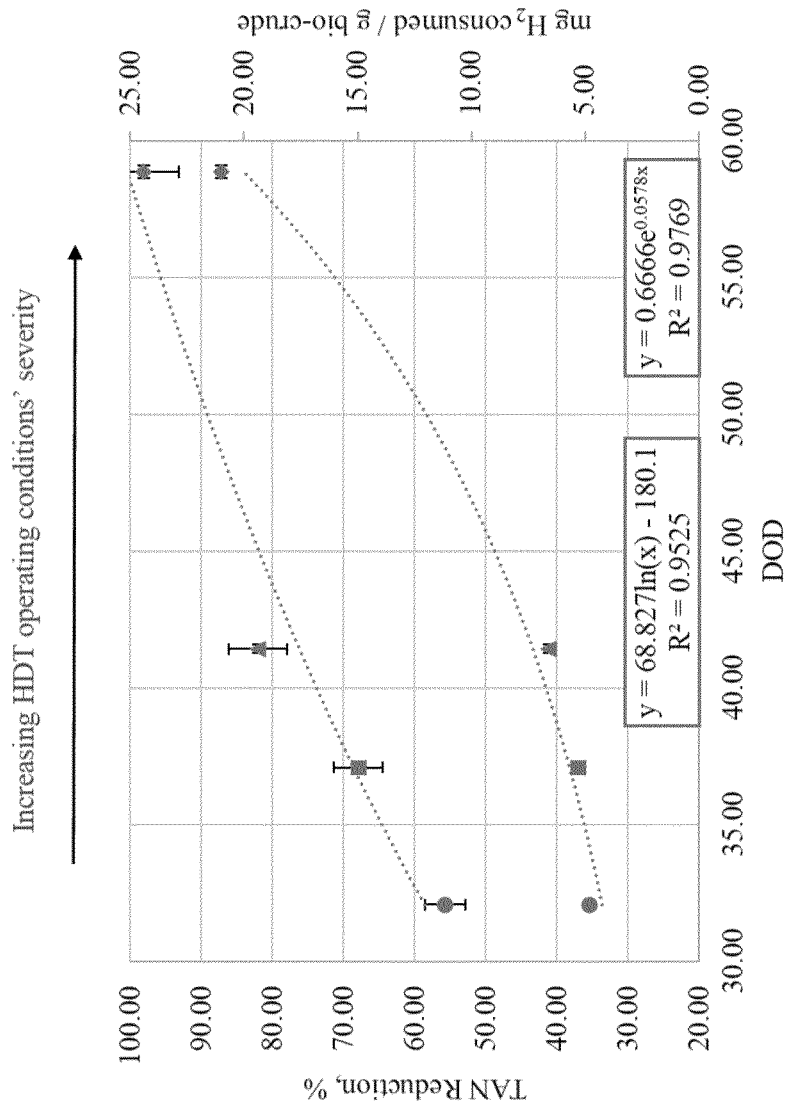
FIG. 5 shows experimental results of screening tests for optimization of the operating conditions in the first reaction zone as further described in example 1.
Figure 6:
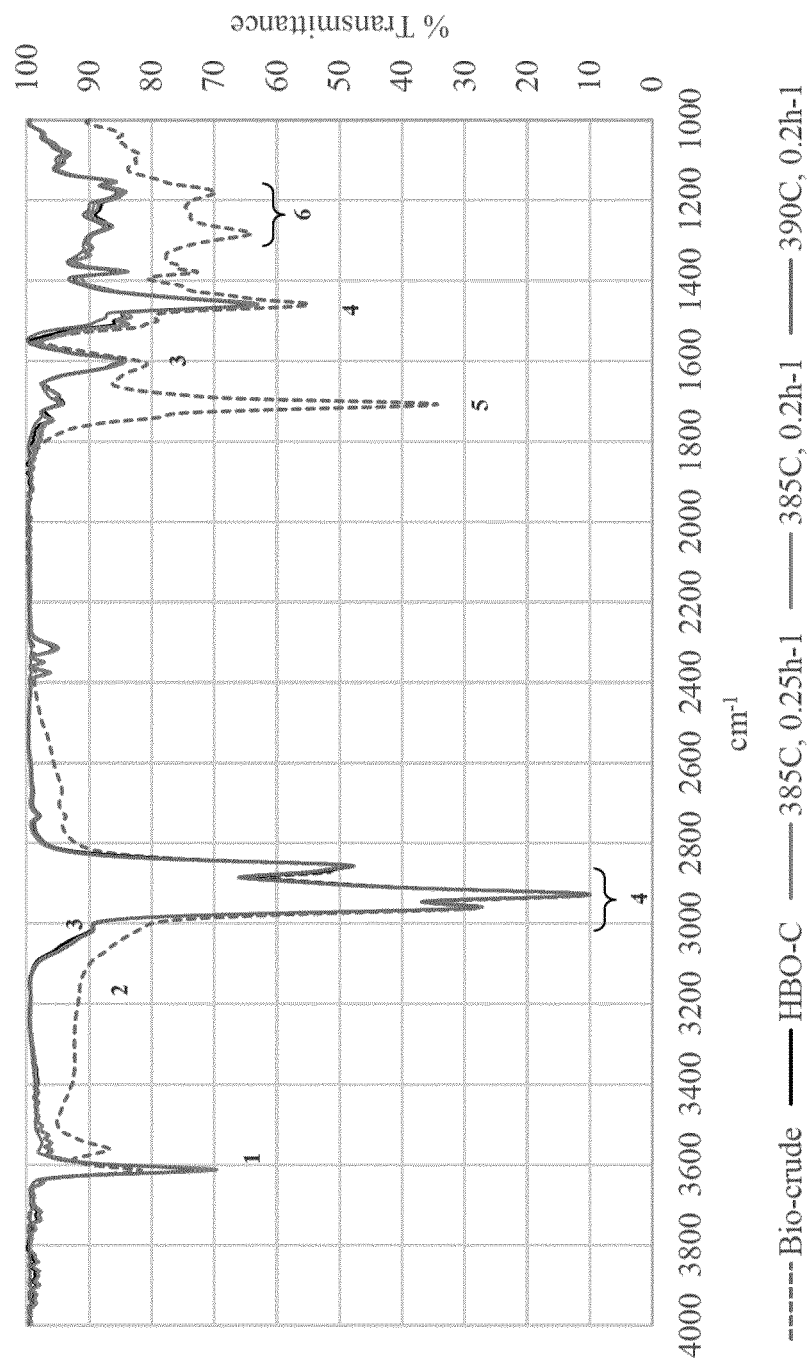
FIG. 6 shows a FTIR spectra of the renewable crude oil and partially upgraded renewable oil after the first reaction zone.

A representation of the TAN reduction, Degree Of Deoxygenation (DOD) and hydrogen consumption as a function of the severity of the HDT process conditions is shown in FIG. 5. The results demonstrate that with the increase in the process severity, the Degree Of Deoxygenation (DOD) of the renewable crude oil increases as well as the TAN reduction. As seen in FIG. 5 the TAN reduction as determined by the titration method reached a maximum of 98% at 320° C. However, as seen from the FTIR spectra in FIG. 6, the titration method for determination of total acid number (TAN) only detects carboxylic acids, but not acidity related to residual phenols. The FTIR spectra were taking in the range of 4000 to 1000 $cm_{-1}$ by dissolving the sample in carbon tetrachloride, and using a liquid cell with CaF2 windows. From the FTIR spectra of the partially upgraded product with TAN of zero, a single band with $v_{max}$=3600 $cm_{-1}$ was observed in the region of free O—H vibrations. This indicates that by removing the carboxylic acids from the renewable crude oil in the first reaction zone, the inter-/intramolecular hydrogen bond associations are destroyed, but a significant portion of residual phenol molecules in the partially upgraded product exist as non-aggregated form. The physicochemical properties of selected partially upgraded products after the first reaction zone are shown in table 7.

TABLE 7

| Physicochemical properties of partially upgrade oil products | | | |
|---|---|---|---|
| Temperature [° C.] | 300 | 310 | 320* |
| WHSV [$h_{-1}$] | 0.25 | 0.2 | 0.2* |
| Pressure [bar] | 62 | 96.5 | 96.5 |
| H₂/oil ratio [scc/cc] | 900 | 900 | 900 |
| Property | | | |
| Viscosity @ 40° C. [cP] | 17500 | 9010 | 3200 |
| TAN [mg KOH/g oil] | 21.3 | 11.6 | <1.0 |
| Oxygen content [wt. %] | 8.5 | 7.5 | 5.1 |
| H/C ratio | 1.38 | 1.43 | 1.47 |
| Distillation cuts [wt %] | | | |
| Naphtha (IBP-190° C.) | ND | 3.1 | 4.4 |
| Kerosene (190-260° C.) | ND | 7.7 | 9.3 |
| Diesel (260-343° C.) | ND | 14.9 | 22.3 |
| VGO (343-550° C.) | ND | 20.5 | 16.5 |
| Residue (550+° C.) | ND | 53.8 | 47.5 |

Example 3

Catalyst Stability in the First Reaction Zone

Catalysts stability and performance in the first reaction zone was evaluated using with Total Acid Number (TAN) as performance indicator in a continuous test over 55 days. The test was performed at and operating pressure of 96.5 bar, a H₂/oil ratio of 1150 SCC/CC, a space velocity (WHSV) of 0.2 $h_{-1}$ and an operating temperature in the isothermal zone varied in the range from 295 to 325° C. The reaction at 310° C. was tested tree times during the length of the campaign. The results are shown in FIG. 7.

Figure 7:
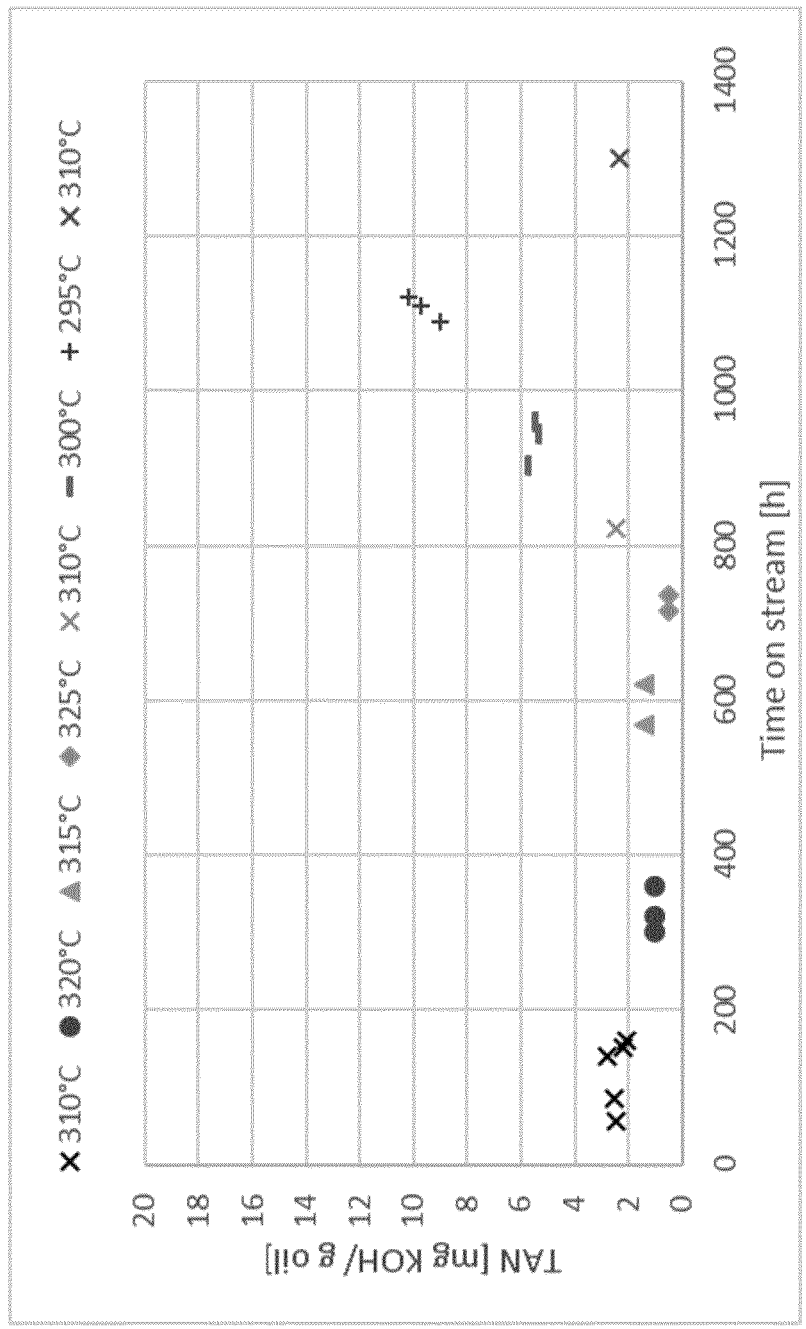
FIG. 7 shows results of a continuous stability and performance test of the heterogeneous catalyst in the first reaction zone over 55 days.

As seen from FIG. 7 the TAN reduction was stable at each reaction temperature tested e.g. at 310° C. the TAN reduction was stable (95%) during 132 hours on stream. At 320° C. the TAN reduction was stable (99%) over 276 h of operation. The same level of TAN (95%) reduction at 310° C. was achieved for a second time after 800 h) and for a third time after 1250 h as shown in FIG. 7. Hence, the catalyst activity was maintained during the course of the test.

Example 4

Catalytic Steam Cracking (First Operational Mode Of Second Reaction Zone) as a Single Upgrading Step Tests of catalytic steam cracking was performed at an operating temperature of 370° C., an operating pressure of 27.6 bar, a space velocity (WHSV) of 0.3 $h_{-1}$ and H₂O to oil ration of 5% by weight. The test indicated that the oil was highly affected by polymerization of reactive species in the renewable crude oil and precipitation of the thermally instable compounds at the reaction temperature. It was found that the reaction conditions resulted in an increase of viscosity, a decrease catalyst activity and an increase of the micro carbon residue content. The test further resulted in an oil product that was solid at room temperature. The result shows the requirement of a hydrotreating step prior to Catalytic Steam Cracking reaction zone (First mode of operation of the second reaction zone) to ensure process stability and efficiency of the catalytic steam cracking reactions.

Example 5

Catalytic Steam Cracking Feedstock Screening

The partially upgraded oil produced in the examples 1, 2 and 3 was used to study the effect of operational conditions and activity of the heterogeneous catalyst. The feedstock dependency was initially evaluated at 27.6 bar, WHSV of 0.25 $h_{-1}$, reaction temperature of 371 to 388° C. and steam to oil ratio of 6.8% by weight.

Figure 8:
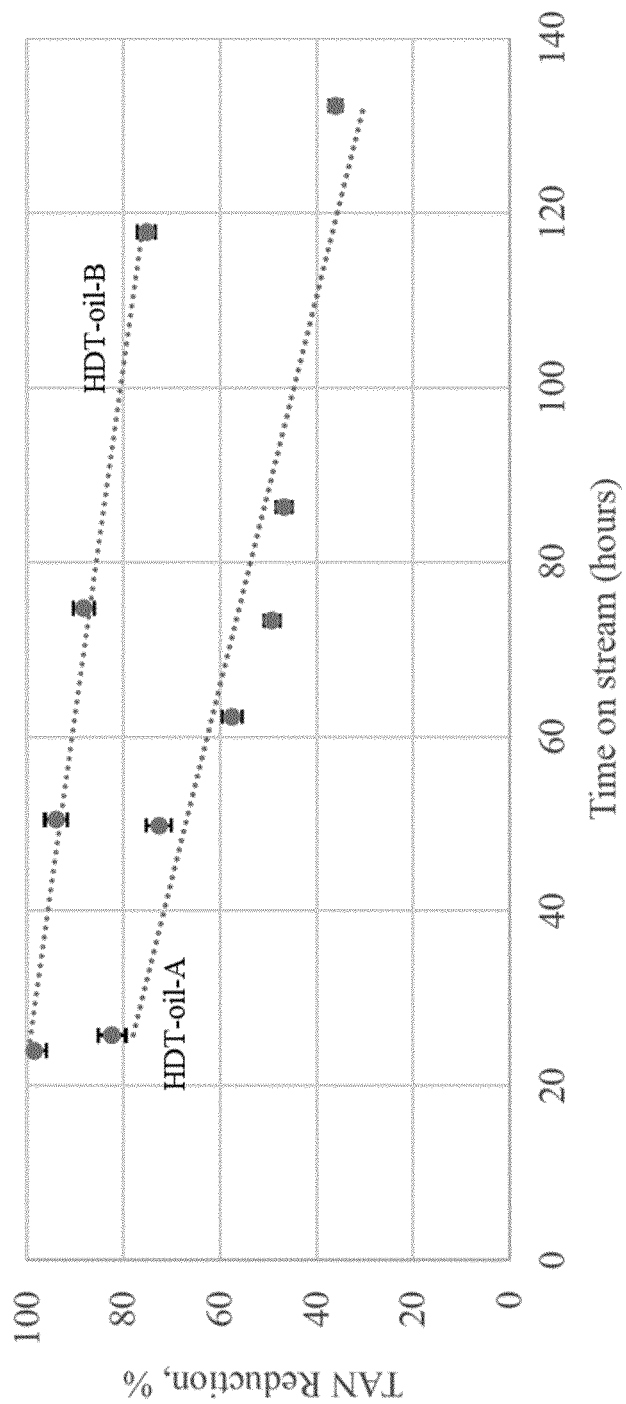
FIG. 8 shows results of a continuous stability and performance test of a heterogeneous catalyst in the first mode of operation for two partially upgraded oils of different quality.
Figure 9:
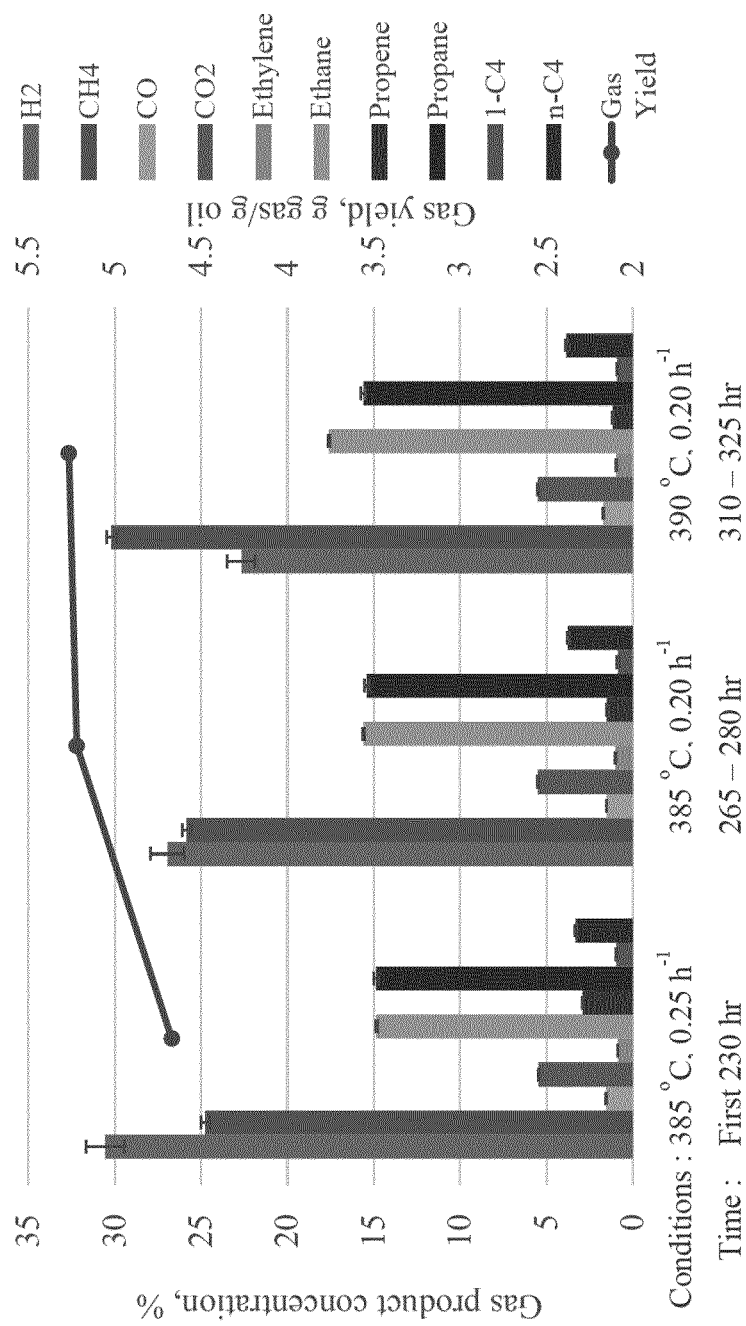
FIG. 9 shows the composition of the gas product from the first mode of operation of the reactors in the second reaction zone at two temperatures and weight based hourly space velocities (WHSV).
Figure 10:
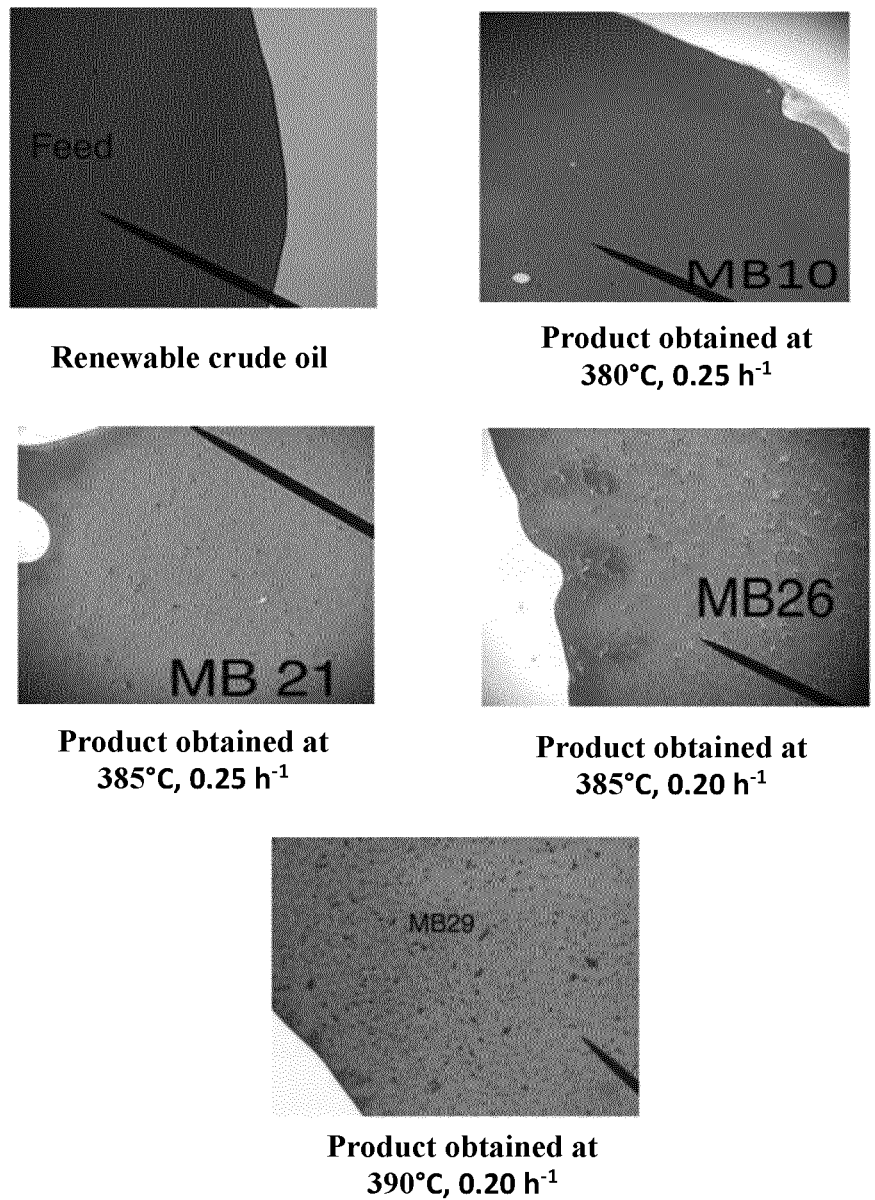
FIG. 10 shows microscopy photos of upgraded oil from the first mode of operation of the reactors in the second reaction zone at different operating temperatures.

Two different partially upgraded oils with different total acid numbers (TAN) were used as feedstocks: Oil-A with TAN of 21.3 mg KOH/g oil and Oil-B with a TAN of 11.6 mg KOH/g. The maximum TAN reduction was 82% and 98%, respectively and were in both cases achieved within the first 24 h of reaction. However, as time progressed, the TAN reduction was compromised due to undesired catalyst deactivation due to coke deposition on the catalyst surface within the first 50 hours of continuous operation as shown in FIG. 8. Further, it seems as the efficiency of CSC cracking reactions are feedstock dependent. Deeper hydrotreatment of the renewable crude oil in the first reaction zone e.g. at more severe operation conditions therefore seems required in order to preserve the activity of the catalytic steam cracking catalyst.

studied, which indicates that the activity of the heterogeneous catalyst was preserved throughout the reaction. An increase of $CO_2$ production would have resulted in case of production of carbonaceous deposits. The gas compositions at the different operating conditions studied are shown in FIG. 9. The production of light hydrocarbons is favored by higher operating temperature as confirmed by the increase of ethane and propane concentration in the gas products. Furthermore, indication of partial consumption of formed hydrogen by the saturation of olefins in the upgraded oil is indicated by the decrease on the hydrogen and propene concentrations at the higher operating temperature. The maximum yield of hydrocarbons in the kerosene and diesel ranges was obtained at 385° C. and 0.2 $h_{-1}$ WHSV. When the operating temperature increases to 390° C., the yield of the fraction having a boiling point in the vacuum gas oil range (VGO) increases while the yields of kerosene and diesel decreases as shown in table 8. The amount of residue as determined by the insoluble fraction in $CS_2$ also increased at 390° C. as further evidenced by increase of solids in the upgraded product observed by microscopy as shown in FIG. 10. This suggest that the optimum operating temperature in the first mode of operation in the second reaction zone is in the range of 380-385° C. for the specific renewable oil and operating conditions in the first reaction zone tested.

TABLE 8

Physicochemical properties of the upgraded renewable oil after the first mode of operation in the second reaction zone.

| Temperature [° C.] | HDT-oil A | 380 | HDT-oil B | 385 | 385 | 390 |
|---|---|---|---|---|---|---|
| WHSV [$h_{-1}$] | — | 0.25 | — | 0.25 | 0.2 | 0.2 |
| Viscosity @ 40° C. [cP] | 3200 | 1039 | 3200 | 837 | 1888 | 1762 |
| MCR [%] | 16.2 | 18.2 | 16.2 | 18.3 | 19.4 | 18.2 |
| $CS_2$ insoluble [%] | 7.4 | 10.8 | 7.4 | 10.0 | 11.6 | 12.5 |
| H/C | — | — | 1.46 | 1.41 | 1.43 | 1.43 |
| Distillation cuts [wt %] | | | | | | |
| Naphtha (IBP-190° C.) | 3.2 | 5.1 | 4.4 | 5.5 | 5.6 | 5.7 |
| Kerosene (190-260° C.) | 8.4 | 10.8 | 9.3 | 11.2 | 12.8 | 11.3 |
| Diesel (260-343° C.) | 21.6 | 25.3 | 22.3 | 23.8 | 25.6 | 23.3 |
| VGO (343-550° C.) | 16.8 | 20.6 | 16.5 | 18.2 | 15.3 | 20 |
| Residue (550+° C.) | 50 | 38.2 | 47.5 | 41.3 | 40.7 | 40.6 |
| 550° C.+ % conversion | — | 30.3 | — | 13.4 ± 1.3 | 14.3 ± 1.4 | 14.4 ± 1.4 |

Pressure 27.6 bar, 5.6 wt. % of steam

Example 6

Screening of Process Conditions for Catalytic Steam Cracking

A deeper hydrotreated partially upgraded oil produced as described in the examples 2 and 3 (i.e. 96.5 bar, 320° C., 0.2 $h_{-1}$) was used as feedstock for screening of the process conditions for the Catalytic Steam Cracking reactions. The test was performed at an operating pressure of 27.6 bar and a steam to oil ratio of 5.0% by weight. The space velocity (WHSV) was varied between 0.2 and 0.25 $h_{-1}$. The operating temperature was varied in the range from 380 to 390° C. during about 320 hours on stream. A constant $CO_2$ production (~5%) and no decrease paraffin-to-olefin ratio were observed at the space velocities and temperatures

Example 7

Second Mode of Operation in the Second Reaction Zone: Steam Reforming of Process Gasses Steam reforming of process gases from reaction zone 1 and first mode of operation in the second reaction zone was simulated in VMG using the thermodynamic Model APR for Natural gas. No separation of hydrogen from the process gases was performed prior to the steam reforming in the second mode of operation in the second reaction zone. The composition of the process gas before and after the steam reforming is shown in table 10, and the assumptions used for the simulation are shown in table 9.

TABLE 9 assumption for steam reforming simulation

| | |
|---|---|
| Gas removed form feed gas stream | $H_2$*, CO and $CO_2$ |
| Reactor | equilibrium |
| $H_2$ consumption | 0.021 g $H_2$/g oil |
| In hydrotreating (reaction zone 1) | |

$$H_2 \text{ balance} = \frac{H_2 \text{ produced CSC (first operational mode)} + H_2 \text{ from gas reforming}}{H_2 \text{ consumed in hydroprocessing(first reaction zone)}}$$

TABLE 10

Gas composition before and after steam reforming in the second mode of operation in the second reaction zone.

| Component | Feed gas stream Molar [%] | Gas product stream* Molar [%] |
|---|---|---|
| Carbon dioxide | 5.55 | 19.22 |
| Carbon monoxide | 1.58 | 0.70 |
| Hydrogen | 24.02 | 57.19 |
| Methane | 26.53 | 20.98 |
| Ethane | 15.92 | 0 |
| Propane | 19.05 | 0 |
| Isobutane | 0 | 0 |
| 1-butane | 0.87 | 0 |
| n-butane | 4.03 | 0 |
| Isopentane | 0 | 0 |
| n-pentane | 0 | 0 |
| n-hexane | 0 | 0 |
| Water | 0 | 1.90 |
| Ethylene | 1.36 | 0 |
| Propylene | 1.09 | 0 |
| 1-butene | 0 | 0 |

Figure 11:
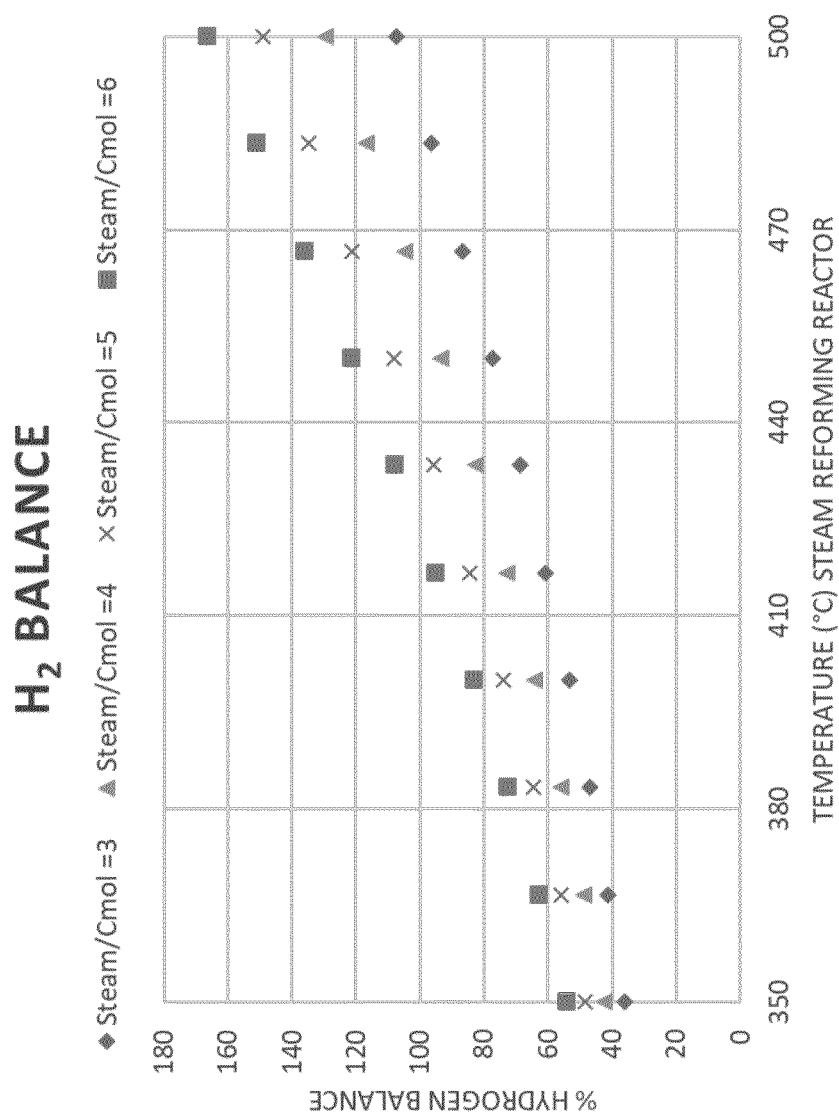
FIG. 11 shows the hydrogen balance expressed as the ratio of the amount of hydrogen contained in the gas product stream after the steam reforming in the second mode of operation of the reactors in the second reaction zone to the amount of hydrogen consumed by the reactions in the first reaction zone is shown as a function of the operating temperature and the molar steam to carbon ratio.

The hydrogen balance expressed as the ratio of the amount of hydrogen contained in the gas product stream after the steam reforming in the second mode of operation of the reactors in the second reaction zone to the amount of hydrogen consumed by the reactions in the first reaction zone is shown as a function of the operating temperature of the steam reforming reactor(-s) for an operating temperature of 1 bar in FIG. 11.

As FIG. 11 indicates, the amount of hydrogen required for the hydrotreating in the first reaction zone can be produced at operating temperatures below 500° C. As further seen from FIG. 11, the required operating temperature necessary to produce sufficient hydrogen for the reactions in the first reaction zone decreases by increasing steam/carbon molar ratio e.g. 100% of the required hydrogen may be produced at 440° C. using 6 steam/carbon molar ratio. These operating temperatures are significantly below the 700 to 1100° C. typically used for conventional steam reforming of natural gas (https://en.wikipedia.org/wiki/Steam_reforming) The possibility of using temperatures below the calcination temperature of the heterogeneous catalyst for Catalytic Steam Cracking (e.g. 550-600° C.) allows for regeneration of the heterogeneous catalyst while the hydrogen is produced by the steam reforming reactions in the same reactor in second mode of operation of the reactor(-s) in the second reaction zone.

Figure 12:
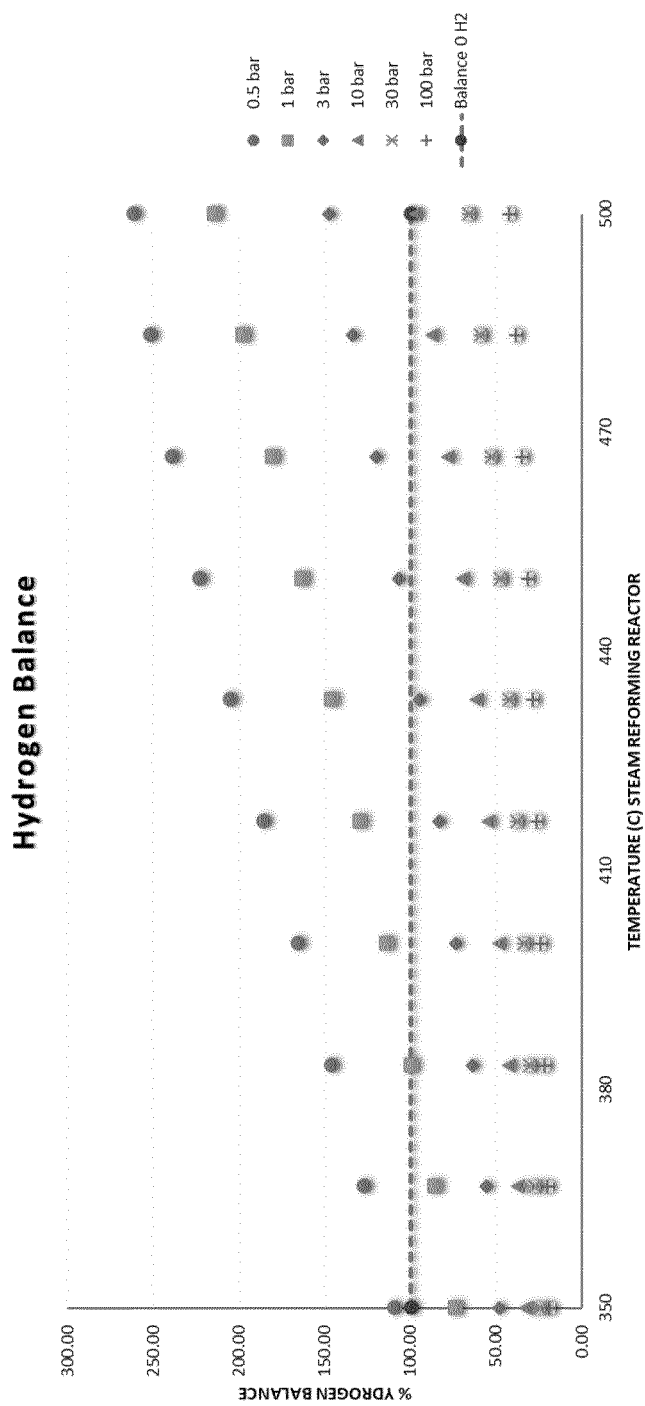
FIG. 12 shows the hydrogen balance expressed as the ratio of the amount of hydrogen contained in the gas product stream after the steam reforming in the second mode of operation of the reactors in the second reaction zone to the amount of hydrogen consumed by the reactions in the first reaction zone is shown as a function of the operating pressure.

FIG. 12 shows the effect of the operating pressure of the reforming reactor(-s) on the hydrogen balance expressed as the ratio of the amount of hydrogen contained in the gas product stream after the steam reforming in the second mode of operation of the reactors in the second reaction zone to the amount of hydrogen consumed by the reactions in the first reaction zone is shown as a function of the operating temperature and operating pressure of the steam reforming reactor(-s) at a fixed molar ratio of steam to carbon of 6. As seen from the figure the hydrogen balance generally improves at lower operating pressures for the reforming reactor(-s). Therefore, a relatively low operating pressure of the reforming reactor(-s) in the second reaction zone is preferred. In a preferred embodiment of the present invention the operating pressure is in the range 0.1 to 10 bar such as in the range 0.3 to 5 bar. Advantageously the operating pressure of the reactor(-s) in the second mode of operation of the second reaction zone is maintained close to atmospheric pressure such as in the range 0.5 to 3.0 bar.

Example 8

Optimization of Residue Conversion and Viscosity Reduction in the First Reaction Zone A highly dispersed molybdenum carbide heterogeneous catalysts with pore size tunned and similar chemical and structural features as the one used in example 1 to 4, was tested under temperatures up to 370° C. and space velocities (WHSV) of 0.2 and 0.4 $h_{-1}$ with the aim of obtain further reduction of viscosity and increase on residue conversion and deoxygenation.

The results indicated that hydrogenation-related reactions and oxygen content reduction were favoured due to the improved accessibility of bulky molecules into and from the active sites confined in the catalyst pore system. As hydroprocessing progress in severity, the oxygen content decreases in the hydrotreated products, reaching a minimum value of 2.5% at 370° C. and WHSV=0.4$h_{-1}$. A similar level of deoxygenation was achieved at 345° C. and WHSV=0.2$h_{-1}$ as presented in table 11. Furthermore, a significant reduction of hydrotreated products' viscosity was obtained, achieving values below 1000 cp at 40° C.

TABLE 11

Physicochemical properties of partially upgraded oil products

| Temperature [° C.] | Feed | 330 | 335 | 340 | 340 | 345 | 350 | 360 | 370 |
|---|---|---|---|---|---|---|---|---|---|
| WHSV [$h_{-1}$] | — | 0.2 | 0.2 | 0.2 | 0.4 | 0.4 | 0.4 | 0.4 | 0.4 |
| Pressure [bar] | — | 120 | 120 | 120 | 120 | 120 | 120 | 120 | 120 |
| $H_2$/oil ratio [scc/cc] | — | 1150 | 1150 | 1150 | 575 | 575 | 575 | 575 | 575 |
| Viscosity @ 40° C. [cP] | 23130 | 1017 | 444 | 343 | 718 | 495 | 353 | 176 | 112 |
| MCR [wt. %] | 20.9 | 13.0 | 12.0 | 11.8 | 13.3 | 13.0 | 12.4 | 10.5 | 10.3 |

TABLE 11-continued

| Physicochemical properties of partially upgraded oil products | | | | | | | | | |
|---|---|---|---|---|---|---|---|---|---|
| Oxygen content [wt. %] | 11.2 | 3.5 | 3.2 | 2.8 | 3.6 | 3.3 | 3.4 | 3.1 | 2.5 |
| H/C ratio | | 1.30 | 1.40 | 1.41 | 1.41 | 1.40 | 1.30 | 1.40 | 1.40 | 1.40 |

Figure 13:
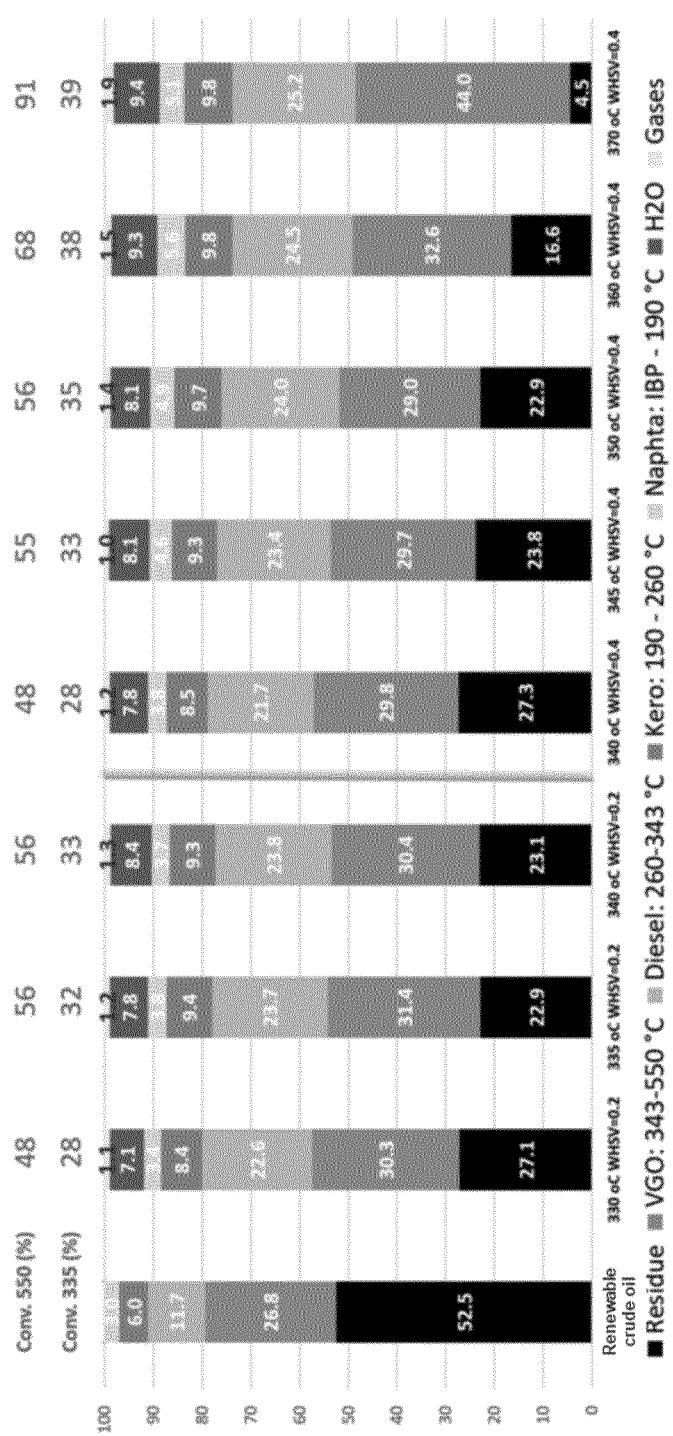
FIG. 13 shows product distribution and conversion for biocrude and the partially upgraded products.

Product distribution and conversion at 343+° C. and 550+° C. for biocrude and the partially upgraded products are shown in FIG. 13. The degree of residue conversion increased with the increase of reaction temperature, achieving a conversion of 91% (i.e. 4.5 wt. %). However, operating at temperatures circa 370° C. in the first reaction stage has contributed to fouling-related pressure buildup across the reactor. Therefore, the most attractive reaction conditions are temperatures between 345 and 360° C. and a space velocity of 0.4 $h_{-1}$ where hydrogen consumption does not exceed 3 mg of $H_2$/g of Oil.

Hereby a more significantly more efficient, economical and environmentally sustainable process is provided.

The invention claimed is:

1. A catalytic process for upgrading a renewable crude oil produced from biomass and/or waste comprising:
   a. providing a renewable crude oil and pressurizing it to a pressure in the range in the range 60 to 150 bar;
   b. contacting the pressurized renewable crude oil with hydrogen and at least one heterogeneous catalyst contained in a first reaction zone at a weight based hourly space velocity (WHSV) in the range 0.1 to 2.0 $h^{-1}$ and at a temperature in the range of 150° C. to 360° C., thereby providing a partially upgraded renewable crude oil;
   c. separating the partially upgraded renewable crude oil from the first reaction zone into a partially upgraded heavy renewable oil fraction, a partially upgraded light renewable oil fraction a water stream and a process gas stream;
   d. introducing the separated and partially upgraded heavy renewable oil fraction and separated process gas to a second reaction zone comprising at least two reactors arranged in parallel and being adapted to operate in a first and a second mode of operation, the reactors comprising dual functioning heterogeneous catalyst(-s) capable of performing a catalytic steam cracking reaction in a first mode of operation or a steam reforming reaction in a second mode of operation, wherein the partially upgraded heavy renewable oil fraction from the first reaction zone is contacted with the dual functioning heterogeneous catalyst and steam at a pressure of 10 to 150 bar and a temperature of 350° C. to 430° C. whereby a catalytic steam cracking of the partially upgraded heavy renewable oil is performed in the reactors in the first mode of operation, thereby providing a further upgraded heavy renewable oil fraction, while separated process gas from the first and/or second reaction zone is contacted with the dual functioning catalyst and steam at a pressure of 0.1 to 10 bar and a temperature of 350 to 600° C. in the reactors in the second mode of operation and contacted with the dual functioning catalyst, thereby producing a hydrogen enriched gas;
   e. separating the further upgraded heavy renewable oil fraction from the catalytically steam cracking reactor into at least one light renewable oil fraction, a heavy renewable oil fraction, a hydrogen rich process gas and a water phase;
   f. separating hydrogen from the hydrogen enriched gas from the catalytic steam cracking zone and/or from the catalytic steam reforming and recycling it to the first reaction zone; and
   g. alternating the reactors between the first mode of operation and the second mode of operation at predetermined time intervals thereby allowing for regeneration of the heterogeneous catalyst for the catalytic steam cracking in the first mode of operation while performing the steam reforming reaction of the hydrocarbons contained in the process gas in the second mode of operation.

2. A process according to claim 1, wherein the separated light oil fraction of the partially upgraded oil from the first reaction zone is mixed with the separated renewable light oil fraction from the second reaction zone and further upgraded in a third reaction zone by pressurizing the light mixture to a pressure in the range from 60 to 150 bar, and contacting the pressurized light mixture with hydrogen and at least one heterogeneous catalyst at a temperature in the range 350 to 420° C. at a weight based hourly space velocity (WHSV) in the range 0.2 to 2 $h^{-1}$.

3. A process according to claim 1, where wherein the pressure in the first reaction zone is in the range 80 to 120 bar.

4. A process according to claim 1, wherein the pressure of the reactor(-s) in the first mode of operation of the reactor(-s) in the second reaction zone is in the range 20 to 60 bar.

5. A process according to claim 1, wherein the pressure of the reactor(-s) in the second mode of operation in the second reaction zone is in the range 1 to 30 bar.

6. A process according to claim 1, wherein the pressurized mixture prior to the first reaction zone is maintained at a temperature in the range 60 to 150° C.

7. A process according to claim 1, wherein the first reaction zone comprises a graded bed with increasing catalyst activity.

8. A process according to claim 1, wherein the operating temperature in the first reaction zone is in the range 280 to 360° C.

9. A process according to claim 1, wherein the operating temperature of reactor(-s) being in the first operational mode in the second reaction zone is in the range 360 to 400° C.

10. A process according to claim 1, wherein the operating temperature of the reactor(-s) being in the second operational mode in the second reaction zone is in the range 370 to 500° C.

11. A process according to claim 1, wherein the amount of hydrogen consumed in the first reaction zone is in the range 0.5 to 6.0% by weight of the renewable crude oil.

12. A process according to claim 1, wherein the total amount of hydrogen consumed in the first reaction zone and third reaction zone is in the range 0.5 to 6.0% by weight of the renewable crude oil.

13. A process according to claim 1, wherein the amount of hydrogen recycled to the first reaction zone and/or third reaction from the second reaction zone comprises at least 50% of the hydrogen consumed in the first reaction zone such as at least ⅔ of the hydrogen consumed in the first reaction zone.

14. A process according to claim 1, wherein the boiling point cut between the light renewable oil fraction and the heavy renewable oil fraction is in the range 200 to 350° C.

15. A process according to claim 1, where the boiling point cut between the light renewable oil fraction and the heavy renewable oil fraction from the catalytic steam cracking step is in the range 300 to 400° C.

16. A process according to claim 1, wherein the heterogeneous catalyst(-s) comprises a hydrotreating and/or a hydrocracking and/or hydroprocessing, and/or hydrodeoxygenation and/or hydrodenitrogenation and/or hydrodearomatization and/or hydroisomerization catalyst or a combination thereof.

17. A process according to claim 16, wherein the heterogeneous catalyst(-s) and/or at least one element of the heterogeneous catalyst(-s) is/are in a reduced form and/or in a sulphide form and/or in a carbide form and/or carbonate form and/or in a nitride form and/or in a phosphide form and/or in a boride form and/or in an oxide form and/or in a sulphate form or a combination thereof.

18. A process according to claim 1, wherein the heterogeneous catalyst in the first reaction zone and/or second reaction zone and/or third reaction zone and/or fourth reaction zone comprises one or more elements selected from the group of Fe, Ni, Co, Mo, Cr, W, Ce, Ru, Rh, Pd, Pt, V, Cu, Au, Zr, Ti, B, Bi, Nb supported on a supporting structure.

19. A process according to claim 18, wherein the heterogeneous catalyst(-s) comprises molybdenum carbide.

20. A process according to claim 1, wherein the heterogeneous catalyst(-s) in the first reaction zone and/or second reaction zone and/or third reaction zone and/or fourth reaction zone is/are a bi-metallic or tri-metallic catalyst supported on a supporting structure.

21. A process according to claim 16, where wherein said heterogeneous catalyst(-s) and/or catalyst elements in the first reaction zone and/or second reaction zone and/or third reaction zone and/or fourth reaction zone comprises:
one or two metals selected from group of Fe, Co, Ni, Ru of the VIIIB group of the periodic table
one or more metals selected from group Cr, Mo, W of group VIB of the periodic table.

22. A process according to claim 21, wherein said catalyst (-s) and/or catalyst element further comprises one or more elements selected from the group of Ce, Cu, Zr, Ti, B, Bi.

23. A process according to claim 1, wherein the heterogeneous catalyst(-s) or an element of the at least one the heterogeneous catalyst(-s) comprises Ce.

24. A process according to claim 1, wherein the supporting structure for said catalyst(-s) or catalyst elements is selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or combinations thereof.

25. A process according to claim 24, wherein the supporting structure for said catalyst(-s) or catalyst elements is selected from the alumina such as γ-alumina or δ-alumina, Si-stabilized γ-alumina, silica, silicates and alumosilicates such as MCM-41, silicoaluminophosphates (SAPO), aerogirine, ceria, activated carbon or combinations thereof.

26. A process according to claim 24, wherein said the support comprises a layered double hydroxide.

27. A process according to claim 26, wherein said the support comprises a hydrotalcite.

28. A process according to claim 1, wherein said heterogeneous catalyst comprises Mg and/or Ca and/or Ni and/or Co and/or Mo and/or Mn and/or Cr and/or Al and/or Fe and/or Ce or a combination thereof.

29. A process according to claim 1, wherein said heterogeneous catalyst has the empirical formula $M(II)_6M(III)_2(OH)_{16}.CO_3.4H_2O$, where
M(II) is a divalent metal ion comprising one or two elements selected from the group of Mg, Ca, Ni, Co, Cu, Mn, Zn, Fe, and
M(III) is a trivalent metal ion comprising one or two elements selected from the group of Al, Fe, Co, Ni, Cr, Bi, Mn, Ce, Ga.

30. A process according to claim 1, wherein said heterogeneous catalyst said further catalytic reactor has the empirical formula $M(II)_6M(III)_2(OH)_{16}.CO_3.4H_2O$, where
M(II) is a divalent metal ion comprising one or two elements selected from the group of Mg, Ca, Ni, Co, Cu, Mn, Zn, Fe, W, Mo and
M(III) is a trivalent metal ion comprising one or two elements selected from the group of Al, Fe, Cr, Bi, Mn, Ce, Ga, Mo, W.

31. A process according to claim 29, where wherein said heterogeneous catalyst has empirical formula $Mg_xNi_yFe_zCe_w Al_q(OH)_{16}.CO_3.4H_2O$, where x: 1.0-2.0, y: 4.0-5.0, z:0.0-1.0, w: 0.0-1.0, q: 1.0-2.0.

32. A process according to claim 31, wherein the heterogeneous catalyst comprises $Mg_{4.3}Ni_{1.70}CeAl(OH)_{16}.CO_3.4H_2O$.

33. A process for upgrading of renewable crude oil according to claim 1, where the step a. Providing a renewable crude oil comprises the steps of:
providing one or more biomass and/or waste material(-s) contained in one or more feedstock;
providing a feed mixture by slurrying the biomass and/or waste material(-s) in one or more fluids at least one of which comprises water;
pressurizing the feed mixture to a pressure in the range 100 to 400 bar;
heating the pressurized feed to a temperature in the range 300° C. to 450° C.;
maintaining the pressurized and heated feed mixture in a reaction zone in a reaction zone for a conversion time of 3 to 30 minutes;
cooling the converted feed mixture to a temperature in the range 25° C. to 200° C.;
expanding the converted feed mixture to a pressure of 1 to 120 bar; and
separating the converted feed mixture in to a renewable crude oil, a gas phase and a water phase comprising water soluble organics and dissolved salts.

34. A process for upgrading of renewable crude oil according to claim 10, wherein the gas produced during said step a. is mixed with the process gases from the first reaction zone and second reaction zone fed to the reactor(-s) in the second reaction zone being in the second mode of operation.

35. A process according to claim 1, wherein the separated heavy fraction from the second reaction zone is further treated by hydrocracking in a fourth reaction zone.

36. A process according to claim 35, wherein the further treatment comprises one or more catalyst comprising a hydrotreating and/or a hydrocracking and/or hydroprocessing, and/or hydrodeoxygenation and/or hydrodenitrogenation and/or hydrodearomatization and/or hydroisomerization catalyst or a combination thereof.

37. A method according to claim 35, wherein the operating pressure in the fourth reaction zone is in the range 50 to 200 bar.

38. A method according to claim 35, where wherein the operating temperature in the fourth reaction zone is in the range 350 to 450° C.

* * * * *